(12) United States Patent
Pao et al.

(10) Patent No.: US 6,907,412 B2
(45) Date of Patent: Jun. 14, 2005

(54) VISUALIZATION AND SELF-ORGANIZATION OF MULTIDIMENSIONAL DATA THROUGH EQUALIZED ORTHOGONAL MAPPING

(75) Inventors: Yoh-Han Pao, Cleveland Heights, OH (US); Zhuo Meng, Cleveland, OH (US)

(73) Assignee: Computer Associates Think, Inc., Islandia, NY (US)

( * ) Notice: Subject to any disclaimer, the term of this patent is extended or adjusted under 35 U.S.C. 154(b) by 345 days.

(21) Appl. No.: 09/816,909

(22) Filed: Mar. 23, 2001

(65) Prior Publication Data

US 2001/0032198 A1 Oct. 18, 2001

Related U.S. Application Data

(63) Continuation of application No. 09/562,777, filed on May 2, 2000, now Pat. No. 6,212,509, which is a continuation of application No. 08/991,031, filed on Dec. 15, 1997, now Pat. No. 6,134,537, which is a continuation-in-part of application No. 08/536,059, filed on Sep. 29, 1995, now Pat. No. 5,734,796.

(51) Int. Cl.$^7$ .............................................. G06N 5/02
(52) U.S. Cl. .............................. 706/16; 706/25; 706/18
(58) Field of Search ....................... 706/16, 2; 382/118; 700/83; 704/9, 254; 364/188; 395/794

(56) References Cited

U.S. PATENT DOCUMENTS

| | | |
|---|---|---|
| 5,003,490 A | 3/1991 | Castelaz et al. |
| 5,113,483 A | 5/1992 | Keeler et al. |
| 5,200,816 A | 4/1993 | Rose |
| 5,218,529 A | 6/1993 | Meyer et al. |
| 5,255,342 A | 10/1993 | Nitta |
| 5,263,120 A | 11/1993 | Bickel |
| 5,293,456 A | 3/1994 | Guez et al. |
| 5,311,600 A | 5/1994 | Aghajan et al. |
| 5,335,291 A | 8/1994 | Kramer et al. |
| 5,337,372 A | 8/1994 | LeCun et al. |
| 5,379,352 A | 1/1995 | Sirat et al. |
| 5,432,864 A | 7/1995 | Lu et al. |
| 5,546,503 A | 8/1996 | Abe et al. |
| 5,619,709 A * | 4/1997 | Caid et al. ................... 395/794 |
| 5,634,087 A | 5/1997 | Mammone et al. |
| 5,642,431 A * | 6/1997 | Poggio et al. ............... 382/118 |
| 5,649,065 A | 7/1997 | Lo et al. |
| 5,687,082 A | 11/1997 | Rizzoni |

(Continued)

FOREIGN PATENT DOCUMENTS

| | | |
|---|---|---|
| EP | 0510632 A2 | 4/1992 |
| WO | WO9320530 | 3/1993 |

OTHER PUBLICATIONS

Chen, S.; Grant, P.M.; Cowan, C.F.N.; Orthogonal least squares algorithm for training multi–output radial basis function network, Artificial Neural Networks, 1991., Second International Conference on , Nov. 18–20, 1991, pp. 336–339.*

(Continued)

Primary Examiner—Wilbert L. Starks, Jr.
(74) Attorney, Agent, or Firm—Cooper & Dunham LLP

(57) ABSTRACT

The subject system provides reduced-dimension mapping of pattern data. Mapping is applied through conventional single-hidden-layer feed-forward neural network with non-linear neurons. According to one aspect of the present invention, the system functions to equalize and orthogonalize lower dimensional output signals by reducing the covariance matrix of the output signals to the form of a diagonal matrix or constant times the identity matrix. The present invention allows for visualization of large bodies of complex multidimensional data in a relatively "topologically correct" low-dimension approximation, to reduce randomness associated with other methods of similar purposes, and to keep the mapping computationally efficient at the same time.

20 Claims, 21 Drawing Sheets

U.S. PATENT DOCUMENTS

| | | | |
|---|---|---|---|
| 5,734,796 A | | 3/1998 | Pao |
| 5,748,508 A | | 5/1998 | Baleneau |
| 5,754,681 A | | 5/1998 | Watanabe et al. |
| 5,774,357 A | * | 6/1998 | Hoffberg et al. ............. 364/188 |
| 5,794,178 A | * | 8/1998 | Caid et al. ...................... 704/9 |
| 5,812,992 A | | 9/1998 | de Vries |
| 5,963,929 A | | 10/1999 | Lo |
| 5,967,995 A | | 10/1999 | Shusterman et al. |
| 6,092,045 A | * | 7/2000 | Stubley et al. ............... 704/254 |
| 6,134,537 A | * | 10/2000 | Pao et al. ...................... 706/16 |
| 6,212,509 B1 | * | 4/2001 | Pao et al. ...................... 706/16 |
| 6,400,996 B1 | * | 6/2002 | Hoffberg et al. ............... 700/83 |
| 2001/0032198 A1 | * | 10/2001 | Pao et al. ...................... 706/2 |

OTHER PUBLICATIONS

Kantsila, A.; Lehtokangas, M.; Saarinen, J.; On equalization with maximum covariance initialized cascade–correlation learning, Circuits and Systems, 2000. Proceedings. ISCAS 2000 Geneva. The 2000 IEEE International Symposium on , vol.: 1 , 2000, Page(s).*

Yasuo Miyamoto, Shigeki Nakauchi and Shiro Usui (1992) "Functional Role of Decorrelation For Color Constancy", Inst. Electronics Info. Commun. Eng., vol. 91, No. 529, pp. 51–58 (Japanese language document and English language translation thereof).

Official Action dated Sep. 10, 2002 in connection with corresponding Japanese Patent Application No. 2000–539447 (Japanese language document and English language translation thereof).

Official Action dated Apr. 15, 2003 in connection with corresponding Japanese Patent Application No. 2000–539447 (Japanese language document and English language translation thereof).

Seiichi Nakagawa, Yoshimitsu Hirata and Yoshiyuki Ono (1992) "Syllable Recognition By Hidden Markov Model Using Fixed–Length Segmental Statistics", Trans. Inst. Electronics Info. Commun. Eng., vol. J75–D–11, No. 5, pp. 843–851.

Fukunaga, K. and Koontz, W.L.G., (1970) "Application of the Karhunen–Loeve expansion to feature selection and ordering", IEEE Transactions on Computers, vol. 19:311–318.

Kohonen, T., (1982) "Self–organized formation of topologically correct feature maps", Biological Cybernetics, vol. 43:59–69.

Oja, E., (1982) "A simplified neuron model as a principal component analyzer", Journal of Mathematics and Biology, vol. 15:267–273.

Linsker, R., (1986) "From basic network principles to neural architecture", Proceedings of the National Academy of Science, USA, vol. 83:7508–7512, 8390–8394, 8779–8783.

Carpenter, G.A. and Grossberg, S., (1987), "ART2: Self–organization of stable category recognition codes for analog input patterns", Applied Optics., vol. 26:4919–4930.

Bourland, H. and Kamp Y., (1988) "Auto–association by multilayer perceptrons and singular value decomposition", Biological Cybernetics, vol. 59:291–294.

Baldi P. and Hornik, K., (1989) "Neural networks and principal component analysis: learning from examples without local minima", Neural Networks, vol. 2:53–58.

Sanger, T.D., (1989) "Optimal Unsupervised learning in a single–layer linear feedforward neural network", Neural Networks, vol. 2:459–465.

Kramer, M., (1991) "Nonlinear principal component analysis using autoassociative feedforward neural networks", AICHE, vol. 37:233–243.

Malki, H.A. and Moghaddamjoo, A., (1991) "Using the Karhunen–Loeve transformation in the back–propagation training algorithm Neural Networks", IEEE Transactions, vol. 21:162–165.

Oja, E., (1991) "Data compression, feature extraction and autoassociation feedforward neural networks", In Artificial Neural Networks, eds. T. Kohonen, O. Simula, and J. Kangas, Elsevier Science Amsterdam, 737–745.

Abbas, H.M. and Fahmy, M.M., (1992) "A neural model for adaptive Karhunen Loeve transformation (KLT)", Neural Networks, IJCNN, vol. 2:975–980.

Abbas, H.M. and Fahmy, M.M., (1993) "Neural model for Karhunen–Loeve transform with application to adaptive image compression", Communications, Speech and Vision, IEE Proceedings I, vol. 140 (2).

Jianchang Mao and Anil K. Jain, (1995) "Artificial Neural Networks for Feature Extraction and Multivariate Data Projection", IEEE Transactions on Neural Networks, vol. 6(2).

Kohonen, T., (1995) "Self–Organizing Maps", Springer–Verlag, Berlin.

Chatterjee, C. and Roychowdhury, V., (1996) "Self–organizing neural networks for class–separability features Neural Networks", IEEE International Conference, vol. 3(3–6):1445–1450.

Tayel, M., Shalaby, H. and Saleh, H., (1996) "Winner–take–all neural network for visual handwritten character recognition", NRSC, 239–249.

Chatterjee, C. and Roychowdhury, V.P., (1997) "On self–organizing algorithms and networks for class–separability features Neural Networks", IEEE International Transactions, vol. 83:663–678.

Yoh–Han Pao and Chan–Yun Shen, (1997) "Visualization of Pattern Data Through Learning of Non–Linear Variance–Conserving Dimension–Reduction Mapping", Pattern Recognition, vol. 30(10):1705–1717.

* cited by examiner

| No. | x1 | x2 | x3 | x4 | x5 | y |
|---|---|---|---|---|---|---|
| 1 | 0.000 | 0.000 | 0.350 | 0.600 | 0.600 | 100.0 |
| 2 | 0.000 | 0.300 | 0.100 | 0.000 | 0.600 | 101.0 |
| 3 | 0.000 | 0.300 | 0.000 | 0.100 | 0.600 | 100.0 |
| 4 | 0.150 | 0.150 | 0.100 | 0.600 | 0.000 | 97.3 |
| 5 | 0.150 | 0.000 | 0.150 | 0.600 | 0.100 | 97.8 |
| 6 | 0.000 | 0.300 | 0.490 | 0.600 | 0.051 | 96.7 |
| 7 | 0.000 | 0.300 | 0.000 | 0.489 | 0.211 | 97.0 |
| 8 | 0.150 | 0.127 | 0.023 | 0.600 | 0.100 | 97.3 |
| 9 | 0.150 | 0.000 | 0.311 | 0.539 | 0.000 | 99.7 |
| 10 | 0.000 | 0.300 | 0.285 | 0.415 | 0.000 | 99.8 |
| 11 | 0.000 | 0.080 | 0.350 | 0.570 | 0.000 | 100.0 |
| 12 | 0.150 | 0.150 | 0.266 | 0.434 | 0.000 | 99.5 |
| 13 | 0.150 | 0.150 | 0.082 | 0.018 | 0.600 | 101.9 |
| 14 | 0.000 | 0.158 | 0.142 | 0.100 | 0.600 | 100.7 |
| 15 | 0.000 | 0.000 | 0.300 | 0.416 | 0.239 | 100.9 |
| 16 | 0.150 | 0.034 | 0.116 | 0.444 | 0.600 | 101.2 |
| 17 | 0.068 | 0.121 | 0.175 | 0.332 | 0.192 | 98.2 |
| 18 | 0.067 | 0.098 | 0.234 | 0.000 | 0.270 | 100.5 |
| 19 | 0.000 | 0.300 | 0.192 | 0.208 | 0.300 | 100.6 |
| 20 | 0.150 | 0.150 | 0.174 | 0.226 | 0.300 | 100.6 |
| 21 | 0.075 | 0.225 | 0.276 | 0.424 | 0.000 | 99.1 |
| 22 | 0.075 | 0.225 | 0.000 | 0.100 | 0.600 | 100.4 |
| 23 | 0.000 | 0.126 | 0.174 | 0.600 | 0.100 | 98.4 |
| 24 | 0.075 | 0.000 | 0.225 | 0.600 | 0.100 | 98.2 |
| 25 | 0.150 | 0.150 | 0.000 | 0.324 | 0.376 | 99.4 |
| 26 | 0.000 | 0.300 | 0.192 | 0.508 | 0.000 | 98.6 | x1 = BUTANE
x2 = ISOPENETANE
x3 = REFORMATE
x4 = CAT CRACKED
x5 = ALKYLATE
y = RESEARCH OCTANE AT 2.0 GRAMS OF LEAD/GALLON

TABLE 2: TIME-DEPENDENT SENSOR DATA PROFILES

| NO. | t:1-5 | t:6-11 | t:12-17 | t:18-23 | t:24-29 | FAULT |
|---|---|---|---|---|---|---|
| 1 | 0.65190 | 0.13019 | 0.31398 | 0.69901 | 0.30067 | 0.00000 |
| 2 | 0.27577 | 0.56790 | 0.24946 | 0.61443 | 0.70156 | 1.00000 |
| 3 | 0.86528 | 0.30303 | 0.10538 | 0.56716 | 0.58797 | 0.00000 |
| 4 | 0.15642 | 0.83277 | 0.58065 | 0.37313 | 0.58352 | 1.00000 |
| 5 | 0.82369 | 0.27834 | 0.24731 | 0.67413 | 0.90200 | 0.00000 |
| 6 | 0.35353 | 0.67116 | 0.16559 | 0.65920 | 0.82405 | 1.00000 |
| 7 | 0.40958 | 0.35241 | 0.41290 | 0.73881 | 0.70601 | 0.00000 |
| 8 | 0.35443 | 0.33782 | 0.55054 | 0.70647 | 0.71269 | 1.00000 |
| 9 | 0.54702 | 0.57350 | 0.59355 | 0.67413 | 0.72606 | 0.00000 |
| 10 | 0.34177 | 0.60718 | 0.79355 | 0.79851 | 0.64588 | 1.00000 |
| 11 | 0.47920 | 0.65208 | 0.67312 | 0.83582 | 0.74833 | 0.00000 |
| 12 | 0.35353 | 0.57800 | 0.94409 | 0.95025 | 0.74610 | 1.00000 |
| 13 | 0.47197 | 0.32099 | 0.36559 | 0.58209 | 0.52561 | 0.00000 |
| 14 | 0.36528 | 0.39843 | 0.44731 | 0.61940 | 0.55457 | 1.00000 |
| 15 | 0.44123 | 0.29854 | 0.34624 | 0.57711 | 0.55457 | 0.00000 |
| 16 | 0.35805 | 0.35354 | 0.42150 | 0.59701 | 0.56793 | 1.00000 |
| 17 | 0.49005 | 0.32997 | 0.41505 | 0.72139 | 0.67929 | 0.00000 |
| 18 | 0.31284 | 0.43547 | 0.43656 | 0.72388 | 0.70601 | 1.00000 |
| 19 | 0.43309 | 0.31874 | 0.39785 | 0.71642 | 0.73497 | 0.00000 |
| 20 | 0.34991 | 0.3625 | 0.44946 | 0.71144 | 0.73051 | 1.00000 |
| 21 | 0.46745 | 0.26936 | 0.40860 | 0.69652 | 0.72160 | 0.00000 |
| 22 | 0.35262 | 0.37261 | 0.42366 | 0.70398 | 0.70601 | 1.00000 |
| 23 | 0.59042 | 0.25253 | 0.48602 | 0.78358 | 0.82628 | 0.00000 |
| 24 | 0.38427 | 0.37486 | 0.48172 | 0.79851 | 0.80401 | 1.00000 |
| 25 | 0.38156 | 0.19753 | 0.40645 | 0.63930 | 0.83296 | 0.00000 |
| 26 | 0.34810 | 0.52189 | 0.44516 | 0.68906 | 0.72160 | 1.00000 |
| 27 | 0.75769 | 0.91134 | 0.44301 | 0.61194 | 0.51225 | 0.00000 |
| 28 | 0.41863 | 1.00000 | 1.00000 | 0.59453 | 0.49220 | 1.00000 |
| 29 | 0.50723 | 0.36364 | 0.40645 | 0.68159 | 0.71715 | 0.00000 |
| 30 | 0.34991 | 0.47250 | 0.45806 | 0.70149 | 0.70156 | 1.00000 |
| 31 | 0.54069 | 0.24691 | 0.38279 | 0.70647 | 0.73051 | 0.00000 |
| 32 | 0.38788 | 0.40404 | 0.38710 | 0.70149 | 0.72383 | 1.00000 |
| 33 | 0.41320 | 0.32660 | 0.41075 | 0.68408 | 0.71715 | 0.00000 |
| 34 | 0.34991 | 0.34007 | 0.49247 | 0.68906 | 0.70379 | 1.00000 |
| 35 | 0.39873 | 0.35354 | 0.44516 | 0.68906 | 0.69710 | 0.00000 |
| 36 | 0.33906 | 0.32323 | 0.58065 | 0.70149 | 0.69710 | 1.00000 |
| 37 | 0.29747 | 0.26824 | 0.42366 | 0.74378 | 0.85746 | 0.00000 |
| 38 | 0.30561 | 0.21886 | 0.36129 | 0.59950 | 0.67038 | 1.00000 |

TABLE 3: SEMICONDUCTOR CRYSTAL STRUCTURE PARAMETERS AND BAND GAPS

| No. | COMPOUNDS | u | a | c | c/a | GAP |
|---|---|---|---|---|---|---|
| 1 | AgGaS2 | 0.28 | 5.75722 | 10.3036 | 1.790 | 2.55 |
| 2 | AgAlS2 | 0.3 | 5.73 | 10.3 | 1.798 | 3.13 |
| 3 | AgGaSe2 | 0.27 | 5.755 | 10.28 | 1.786 | 1.8 |
| 4 | CdSiAs2 | 0.298 | 5.884 | 10.882 | 1.849 | 1.55 |
| 5 | CdGeP2 | 0.2839 | 5.738 | 10.765 | 1.876 | 1.72 |
| 6 | AgAlTe2 | 0.26 | 6.296 | 11.83 | 1.879 | 2.25 |
| 7 | CdGeAs2 | 0.278 | 5.9432 | 11.2163 | 1.887 | 0.6 |
| 8 | AgGaTe2 | 0.26 | 6.3197 | 11.9843 | 1.896 | 1.1 |
| 9 | AgInTe2 | 0.25 | 5.836 | 11.1789 | 1.916 | 1.9 |
| 10 | CdSnP2 | 0.265 | 5.9 | 11.518 | 1.952 | 1.7 |
| 11 | CuAlSe2 | 0.26 | 5.6103 | 10.982 | 1.957 | 2.6 |
| 12 | AgInSe2 | 0.25 | 6.455 | 12.644 | 1.959 | 0.96 |
| 13 | CdSnAs2 | 0.262 | 6.09 | 11.94 | 1.961 | 0.26 |
| 14 | ZnGeP2 | 0.25816 | 5.46 | 10.71 | 1.962 | 2.34 |
| 15 | CuAlS2 | 0.27 | 5.31 | 10.42 | 1.962 | 3.35 |
| 16 | ZnGeAs2 | 0.25 | 5.66 | 11.154 | 1.971 | 0.75 |
| 17 | CuFeS2 | 0.27 | 5.289 | 10.423 | 1.971 | 0.53 |
| 18 | AgAlSe2 | 0.27 | 5.95 | 10.75 | 1.807 | 2.6 |
| 19 | CuAlTe2 | 0.25 | 5.964 | 11.78 | 1.975 | 2.06 |
| 20 | CuGaTe2 | 0.25 | 6.013 | 11.934 | 1.985 | 1.24 |
| 21 | CuTiSe2 | 0.25 | 5.832 | 11.63 | 1.994 | 1.07 |
| 22 | ZnSnAs2 | 0.231 | 5.851 | 11.702 | 2.000 | 0.65 |
| 23 | ZnSnP2 | 0.238 | 5.65 | 11.3 | 2.000 | 1.66 |
| 24 | ZnInSe2 | 0.224 | 5.784 | 11.614 | 2.008 | 0.95 |
| 25 | CuInS2 | 0.2 | 5.5228 | 11.1321 | 2.106 | 1.54 |
| 26 | CuGaS2 | 0.25 | 5.555 | 11.0036 | 1.981 | 1.71 |

Fig. 13

VISUALIZATION AND SELF-ORGANIZATION OF MULTIDIMENSIONAL DATA THROUGH EQUALIZED ORTHOGONAL MAPPING

RELATED APPLICATIONS

This is a continuation of U.S. application Ser. No. 09/562,777, filed May 2, 2000, now U.S. Pat. No. 6,212,509, issued Apr. 3, 2001, which is a continuation of U.S. Ser. No. 08/991,031, filed Dec. 15, 1997, now U.S. Pat. No. 6,134,537, issued Oct. 17, 2000, which is a continuation-in-part of U.S. Ser. No. 08/536,059, filed Sep. 29, 1995, now U.S. Pat. No. 5,734,796, issued Mar. 31, 1998, all of which are incorporated herein by reference.

BACKGROUND OF THE INVENTION

This application pertains to the art of artificial intelligence, and more particularly to a system for organizing a large body of pattern data so as to organize it to facilitate understanding of features.

The subject system has particular application to analysis of acquired, empirical data, such as chemical characteristic information, and will be described with particular reference thereto. However, it will be appreciated that the subject system is suitably adapted to analysis of any set of related data so as to allow for visualization and understanding of the constituent elements thereof.

It is difficult to make sense out of a large body of multi-featured pattern data. Actually the body of data need not be large; even a set of 400 patterns each of six features would be quite difficult to "understand." A concept of self-organization has to do with that type of situation and can be understood in terms of two main approaches to that task. In one case, an endeavor is directed to discovering how the data are distributed in pattern space, with the intent of describing large bodies of patterns more simply in terms of multi-dimensional clusters or in terms of some other distribution, as appropriate. This is a dominant concern underlying the Adaptive Resonance Theory (ART) and other cluster analysis approaches.

In a remaining case, effort is devoted to dimension reduction. The corresponding idea is that the original representation, having a large number of features, is redundant in its representation, with several features being near repetitions of each other. In such a situation, a principal feature extraction which is accompanied by dimension reduction may simplify the description of each and all the patterns. Clustering is suitably achieved subsequently in the reduced dimension space. The Karhunen-Loeve (K-L) transform, neural-net implementations of the K-L transform, and the auto-associative mapping approach are all directed to principal component analysis (PCA), feature extraction and dimension reduction.

In actuality the two streams of activity are not entirely independent. For example the ART approach has a strong "winner-take-all" mechanism in forming its clusters. It is suitably viewed as "extracting" the principal prototypes, and forming a reduced description in terms of these few principal prototypes. The feature map approach aims at collecting similar patterns together through lateral excitation-inhibition so that patterns with similar features are mapped into contiguous regions in a reduced dimension feature map. That method clusters and reduces dimensions. The common aim is to let data self organize into a simpler representation.

A new approach to this same task of self-organization is described in herein. The idea is that data be subjected to a nonlinear mapping from the original representation to one of reduced dimensions. Such mapping is suitably implemented with a multilayer feedforward neural net. Net parameters are learned in an unsupervised manner based on the principle of conservation of the total variance in the description of the patterns.

The concept of dimension reduction is somewhat strange in itself. It allows for a reduced-dimension description of a body of pattern data to be representative of the original body of data. The corresponding answer is known for the linear case, but is more difficult to detail in the general nonlinear case.

A start of the evolution leading to the subject invention may be marked by noting the concept of principal component analysis (PCA) based on the Karhunen-Loeve (K-L) transform. Eigenvectors of a data co-variance matrix provide a basis for an uncorrelated representation of associated data. Principal components are those which have larger eigenvalues, namely those features (in transformed representation) which vary greatly from pattern to pattern. If only a few eigenvalues are large, then a reduced dimension representation is suitably fashioned in terms of those few corresponding eigenvectors, and nearly all of the information in the data would still be retained. That utilization of the Karhunen-Loeve transform for PCA purposes has been found to be valuable in dealing with many non-trivial problems. But in pattern recognition, it has a failing insofar as what is retained is not necessarily that which helps interclass discrimination.

Subsequent and somewhat related developments sought to link the ideas of PCA, K-L transform and linear neural networks. Such efforts sought to accomplish a linear K-L transform through neural-net computing, with fully-connected multilayer feedforward nets with the backpropagation algorithm for learning the weights, or with use of a Generalized Hebbian Learning algorithm. In this system, given a correct objective function, weights for the linear links to any of the hidden layer nodes may be noted to be the components of an eigenvector of the co-variance matrix. Earlier works also described how principal components may be found sequentially, and how that approach may avoid a tedious task of evaluating all the elements of a possibly very large co-variance matrix.

The earlier works begged the question of what might be achieved if the neurons in the networks were allowed to also be nonlinear. Other efforts sought to address that question. In one case, the original data pattern vectors are subjected to many layers of transformation in a multilayer feedforward net, but one with nonlinear internal layer nodes. An output layer of such a net has the same number of nodes as the input layer and an objective is to train the net so that the output layer can reproduce the input for all inputs. This provides a so-called auto-associative learning configuration. In addition, one of the internal layers serves as a bottle-neck layer, having possibly a drastically reduced number of nodes. Now, since the outputs from that reduced number of nodes can closely regenerate the input, in all cases, the nodes in the bottle-neck layer might be considered to be a set of principal components. That may prove to be an acceptable viewpoint, except for the fact that the solutions attained in such learning are not unique and differ radically depending on initial conditions and the order in which the data patterns are presented in the learning phase. Although the results are interesting, there is no unique set of principal components.

In another earlier feature map approach, dimension reduction is attained in yet another manner. A reduced-dimension space is suitably defined as two dimensional. The reduced-dimension space is then spanned by a grid of points and a pattern vector is attached to each of those grid points. These pattern vectors are chosen randomly from the same pattern space as that of the problem. Then the pattern vectors of the problem are allocated to the grid points of the reduced-dimension space on the basis of similarity to the reference vector attached to the grid. This leads to a biology inspired aspect of the procedure, namely that of lateral excitation-inhibition. When a pattern vector is allocated to a grid point, at first it would be essentially be at random, because of that grid point happening to have a reference vector most similar to the pattern vector. But once that allocation is made, the reference vector is modified to be even more like that of the input pattern vector and furthermore, all the reference vectors of the laterally close grid points are modified to be more similar to that input pattern also. In this way, matters are soon no longer left to chance; patterns which are similar in the original pattern space are in effect collected together in reduced dimension space. Depending on chance, sometimes two or more rather disparate zones can be built up for patterns which could have been relegated to contiguous regions if things had progressed slightly differently. On the other hand, results of that nature may not be detrimental to the objectives of the computational task.

The ART approach to self-organization of data can be mentioned in this context because the MAX-NET implements a winner-take-all approach in building up clusters and there is indeed lateral inhibition even though it is not related to the distance between cluster centers in cluster space. There is data compression but no dimension reduction.

According to a first aspect of the present invention, the above-noted problems and others, are addressed to provide a system for autonomous reduction of pattern dimension data to a largely unambiguous, two-dimensional representation using an extremely efficient system.

It is appreciated that many tasks in engineering involve the process of extracting useful information from unorganized raw data. However, as discussed above, it is a challenging task to make sense out of a large set of multidimensional data. The difficulty mainly lies in the fact that the inter-pattern relationship cannot be readily grasped. Visual display has been one of the most useful tools to guide this kind of analysis. Unfortunately, it is not directly possible to realize in a meaningful manner for dimensions higher than three.

As indicated above, the complexity of raw data must be reduced in order to understand the meaning thereof. Generally, two major categories of approaches are used to tackle this problem. In the first category, information such as the Euclidean distance between data patterns is used to infer how the data patterns are distributed in the multidimensional space, using methods such as clustering or Kohonen's self-organizing map (SOM). The emphasis of these methods is to describe large amounts of data patterns more concisely with cluster attributes or some other distributions.

The second category of approaches emphasizes the reduction of dimensions, i.e., the reduction of the number of features necessary to describe each and all of the data patterns. The idea is that perhaps the dimensions of the original data space are not all independent of each other, i.e. these dimensions may be some complicated functions of just a few, independent inherent dimensions albeit not necessarily among those known. Accordingly, the objective is to use this reduced-dimension space to describe the patterns. Some methods belonging to this category are linear principal component analysis (PCA) through the Karhunen-Loeve (K-L) transform, neural-net implementations of PCA, the autoassociative mapping approach and the non-linear variance-conserving (NLVC) mapping. These methods generally try to map the high-dimensional space to the lower one. There are also methods to do the reverse. An example is generative topographic mapping (GTM), described in a paper by C. M. Bishop, M. Svensen and C. K. I. Williams entitled "GTM: The generative topographic mapping."

However it should be appreciated that the two categories discussed above are not entirely distinct. Clustering could be used subsequently in the the reduced-dimension space to further help the comprehension of the data. The SOM approach collects similar patterns together through lateral excitation-inhibition in a reduced-dimension feature map. Therefore, SOM both clusters and reduces dimension.

Except for linear PCA methods which are limited by their linearity nature already, other methods mentioned above either map the high dimensional data to discrete grid points in the lower dimensional space or the appearance of the lower dimensional map closely depends on the initial (usually random) choice of mapping parameters or both.

The grid point maps are usually useful in applications such as classification and encoding where exact relative positions of the data points are not of critical importance as long as close points in original data space remain close in the map. For example, the GTM approach starts with a grid of points in the lower dimension and a set of non-linear basis functions, which were assumed to be radially symmetric Gaussians evenly distributed in the lower dimensional space. A mapping of the grid points from the lower dimension to the higher dimension is assumed to be of a linear weighted sum of those basis functions. Then, the probability density of the higher dimension is proposed to be formed by radially symmetric Gaussians centered on those grid points just mapped to the higher dimension. In Bishop's works on GTM, it is assumed that the Bayes' rule can be used to invert the mapping and to estimate the responsibility of each grid point to the distribution in the higher dimensional space. The likelihood of data points in the higher dimension can then be re-estimated with the responsibility information. By optimizing this result to give the distribution of the known data points in the higher dimension, the iterative learning procedure of the weight parameters of the mapping and width parameters of the Gaussians forming the density distribution is obtained. A lower dimensional map of the data points for viewing can be generated by the responsibility information upon convergence of the learning. Provided that the mapping function is smooth and continuous, adjacent points in the lower dimension will map to adjacent points in the higher dimension. But the reverse is not necessarily true since for a given data point in the higher dimension the responsibilities of the Gaussians on grid points may be multi-modal due to the shape of the manifold generated by the mapping function. Instead of being the responsibility of one or a few adjacent grid points, the data point may be the responsibility of several distant grid points on the lower dimensional map. Although such a map may still be useful for some classification and similar purposes, it would be inappropriate to use this kind of a map for optimization since it would be difficult to interpret interpolation between grid points on such a map. Other grid point maps such as those obtained by SOM, may also have the same type of difficulty in interpreting interpolation between grid points.

Although a non-linear PCA type mapping such as the autoassociative mapping or NLVC mapping do not have the interpolation difficulty, the appearance of the lower dimensional map is usually dependent on the choice of initial parameters. This dependence is described below using NLVC mapping as an example. To obtain a map with good distribution of data points, a number of trials may be necessary until a satisfactory one can be found.

According to a second aspect of the present invention, the foregoing complexity-reduction problems, as well as others, are addressed. In this regard, an approach referred to as Equalized Orthogonal Mapping (EOM) is described herein. This approach falls into the second category and is developed with considerations on the interpolation capability and reduction of dependence on initial parameters in mind.

The EOM approach can be implemented through a back-propagation learning process. The detailed equations for this procedure are derived and described below. Examples of use of EOM in obtaining reduced dimension maps and comparisons with the SOM and NLVC approaches are also described. Moreover, results are given for two situations. In one case the input data is seemingly of 5 dimensions but is actually 2-D in nature. In another case, the mapping is applied to a body of gasoline blending data and potential use of the resulting map for optimization is demonstrated.

It should be appreciated that while the following description of the present invention is directed to mapping in cases where the reduced-dimension representation is of 2-D, so that the representation can be easily visualized, the present invention is suitable for other dimensions as well.

SUMMARY OF THE INVENTION

In accordance with the present invention, there is provided a system for organization of multi-dimensional pattern data into a dimensional representation that includes a neural network. The neural network is comprised of layers of neural nodes. These layers include an input layer and an output layer and one or more hidden layers disposed therebetween. The output layer is comprised of first and second non-linear nodes that share a common internal network representation. Multi-dimensional pattern data are received into the input layer of the neural network. The system generates an output signal at the output layer of the neural network, which output signal corresponds to a received multi-dimensional pattern.

In accordance with another aspect of the present invention, there is provided an organization of multi-dimensional pattern data into a two-dimensional representation to further include a system for completing supervised learning of weights of the neural network.

In accordance with yet a further aspect of the present invention, there is provided a method for organization of multi-dimensional pattern data into a two-dimensional representation which includes the steps of receiving multi-dimensional pattern data into a neural network and outputting, via the neural network which has been trained by backpropagation, an output signal. The output signal is generated by an output layer which consists of first and second non-linear nodes which share a common internal network representation.

In accordance with a more limited aspect of the method of the subject invention, there is provided the steps of completing a training of the neural network to accomplish the foregoing.

According to yet another aspect of the present invention, there is provided a new approach to dimension-reduction mapping of multidimensional pattern data. This approach applies the mapping through a conventional single-hidden-layer feed-forward neural network with non-linear neurons, but with a different objective function which equalizes and orthogonalizes the lower dimensional outputs by reducing the covariance matrix of the outputs to the form of a diagonal matrix, or a constant times the identity matrix, rather than specifying what the outputs should be as in a conventional net used in function estimation. Since no attribute information is used in this mapping, it is essentially an unsupervised learning procedure. A detailed backpropagation learning procedure of such a mapping is described herein.

In accordance with another aspect of the present invention, there is provided a method for visualizing large bodies of complex multidimensional data in a relatively "topologically correct" low-dimension approximation, to reduce the randomness associated with other methods of similar purposes and to keep the mapping computationally efficient at the same time. Examples of the use of his approach in obtaining meaningful 2-D maps and comparisons with self-organizing mapping (SOM) and non-linear variance-conserving (NLVC) mapping approaches are described herein.

An advantage of the present invention is the provision of a neural network which allows for automated creation of a two-dimensional representation of pattern data.

Still another advantage of the present invention is the creation of a two-dimensional representation of pattern data which isolates related characteristics disposed within the pattern data in an unambiguous fashion so as to allow for human visualization and cataloging of features.

Still another advantage of the present invention is the provision of a neural network for organization of pattern data efficiently so as to allow for real-time computation with conventional processing hardware.

Yet another advantage of the present invention is the provision of a system which reduces the dimensions of pattern data by controlling the variance.

Yet another advantage of the present invention is the provision of a system which reduces the dimensions of pattern data by reducing the covariance matrix of the outputs to the form of a diagonal matrix or a constant times the identity matrix.

Further advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 11 illustrates a table of benchmark gasoline blending data;

FIG. 12 illustrates a table of time-dependent sensor data profiles;

FIG. 13 provides a table of semi-conductor crystal structure parameters and band gaps;

DETAILED DESCRIPTION OF THE PREFERRED EMBODIMENTS

Figure 1:
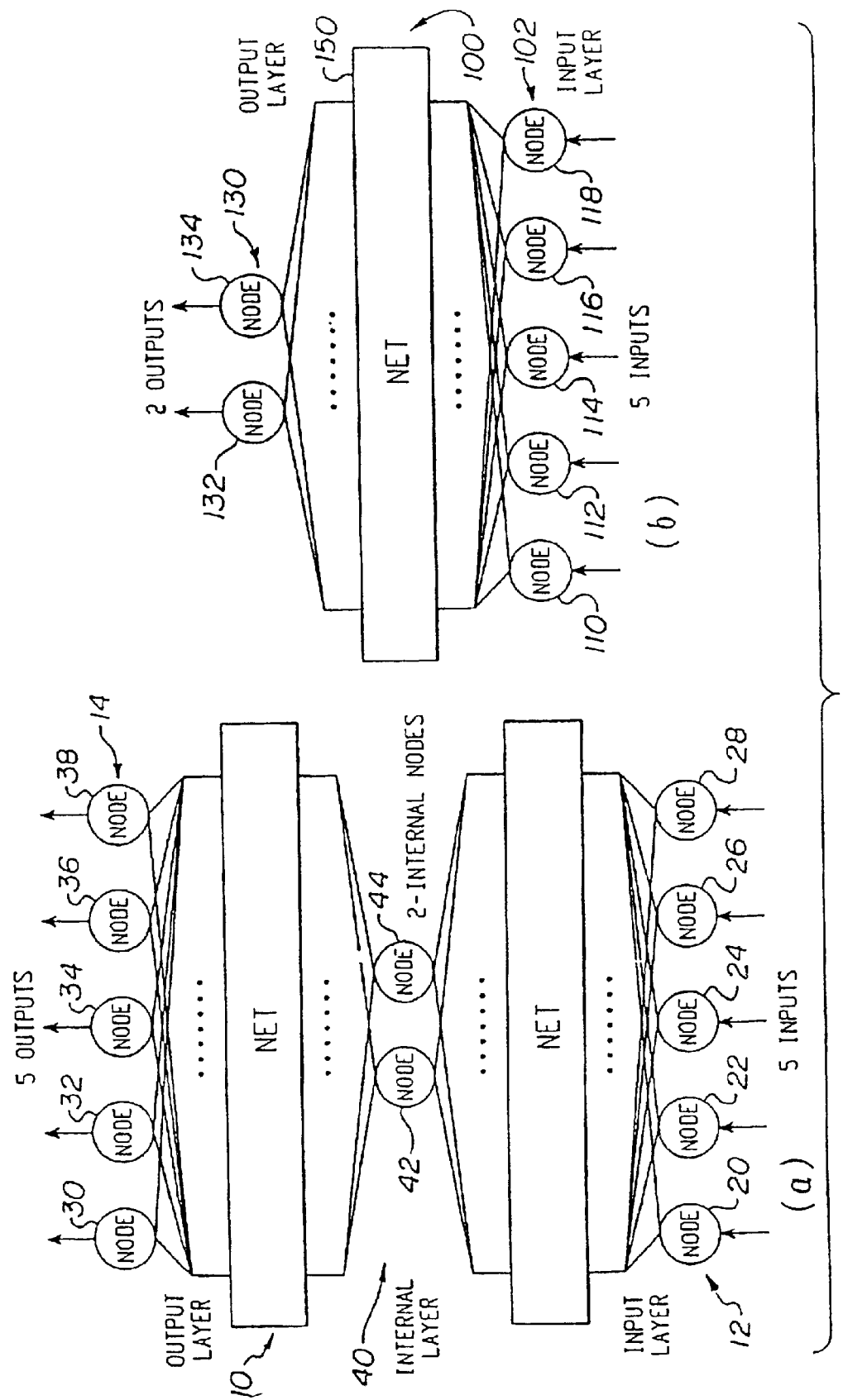
FIG. 1 illustrates an earlier, auto-associative network relative to the subject non-linear variance-conserving (NLVC) mapping with dimension reduction employed by the preferred embodiment of the subject invention.

Referring now to the drawings wherein the showings are for the purposes of illustrating a preferred embodiment of the invention only and not for purposes of limiting same, FIG. 1 illustrates, in portion (a) an auto-associated approach while portion (b) illustrates non-linear variance-conserving mapping with dimension reduction as provided by the preferred embodiment. The two will be described independently. The side-by-side illustration for the advantages and distinctions in architecture between the approach (a) of earlier attempts and the architecture of the subject, preferred embodiment.

In the portion (a), a neural network 10 has an input layer 12 and an output layer 14. In the illustration of portion (a), the input layer 12 is comprised of five nodes, 20, 22, 24, 26, and 28, each of which has an associated input thereto. The output layer 14 is also illustrated as being comprised of five nodes, 30, 32, 34, 36, and 38. The number of illustrated nodes in each of the input layer 12 and the output layer 14 is not limited to five. Any plurality may be chosen for such layer and these values need not be identical. Specific numbers of nodes are highly application specific. An arbitrary internal layer 40 disposed within the neural network 10 is narrowed to two internal nodes 42 and 44. From the illustration, it will be appreciated that there is therefore a funneling or necking of all pattern data that is provided by the illustrated layer 40.

Turning next to portion (b) of the preferred embodiment, neural network 100 includes an input layer 102. Input layer 102, for illustrative purposes only, is noted to comprise a plurality of inputs formed as five input neurons 110, 112, 114, 116, and 118. It will be appreciated that the disclosed architecture of the neural network 100 includes no internal portion analogous to that internal layer 40 provided by portion (a).

The architecture of (b) provides an output layer 130 comprised of first and second neurons 132 and 134. Two neurons are chosen at the output layer 130 by way of example of the preferred embodiment. This choice allows for two-dimensional realization and visualization of the pattern data. It will be appreciated from the description below that the output layer of the preferred embodiment is comprised entirely of non-linear nodes sharing a common internal network representation. As with the description of (a), it is to be appreciated that a number of nodes forming input layer 102 is chosen pursuant to the particular application and hardware choices.

Next, a dimension reduction from 5 to 2 is considered for illustration purposes. In the auto-associative approach, a net such as that shown in FIG. 1(a) would be used and it would be trained so that the net serves as the identity operator. The output vector of the net would always be nearly the same as the input pattern vector. If the intrinsic dimensionality of the data is more then 2-D, then the net will be appreciably different from an identity operator. The net is trained in what is sometimes called a self-supervised manner.

The net to be used in the present new approach is less complex. The intent is to conserve as much of the data information as possible with a 2-D representation instead of five. The net for computing the 2-D representation is simply that illustrated in FIG. 1(b), to be trained according to the criterion that the variance in the 2-D representation be as nearly the same as that of the 5D representation. In this approach, it is essential that the outputs nodes be nonlinear and that they share a common internal network representation.

Let $\{x_p\}$, p=1, 2, ..., P, be a set of data pattern vectors, wherein P is defined as a positive integer, and wherein the set of data pattern vectors has a total variance given by:

$$V = (1/P) \sum_{p=1}^{p=P} \sum_{i=1}^{i=S} (x_{ip} - \langle x_i \rangle)^2, \qquad \text{(Equation 1)}$$

where: dimension S=5 originally, the < > notation denotes the average or mean taken over the set of input data pattern vectors for each indicated component (i.e., $<x_1>$ denotes the mean value of of $x_{ip}$ evaluated over the set of data pattern vectors), and $x_{ip}$ is the ith component of $x_p$, the pth member of a set of data pattern vectors. It should be understood that a "measure" of the total variance is a linear or non-linear function of the total variance.

The net shown in FIG. 1(b) is now trained so that the variance calculated in the reduced dimension representation, for the same set of data pattern vectors, is as closely to V as possible.

Using the Backpropagation algorithm for training, the expressions for progressively changing the weights for the output nodes are as usual:

$$\Delta w_{kj} = (1/P)\sum_{p=1}^{p=P} \Delta w_{p,kj} = (1/P)\sum_{p=1}^{p=P} \eta \delta_{pk} O_{pj} \quad \text{(Equation 2)}$$

where all the symbols have their usual conventional meanings. In this respect, $O_{pj}$ is the output signal from the jth node in the layer preceeding the output layer due to the pth data pattern, $\eta$ is a constant of suitable value chosen, to provide efficient convergence but to avoid oscillation, and $\delta_{pk}$ is a value proportional to the contribution to the error E by the outputs of the kth node of the output layer for the pth input data pattern (i.e., a measure of the sensitivity of the variance).

The difference between the present case and the standard supervised learning task of neural-net computing comes in the expression for $\delta_{pk}$ which in this case (i.e., sigmoidal) is given by:

$$\delta_{pk} = [V - (1/P)\sum_{q}\sum_{n}(O_{qn} - \langle O_n \rangle)^2] \quad \text{(Equation 3)}$$

$$(O_{pk} - \langle O_k \rangle) O_{pk}(1 - O_{kp})$$

In equation (3), V is the variance calculated for the training set of input data patterns, and the double sum within the rectangular brackets yields the variance for the output, reduced-dimension, representation of the same data. The effect of the learning procedure is to try to decrease the delta values while minimizing the difference between the original and reduced-dimension variances as much as possible.

From the illustration of FIG. 1, it will be recalled that the hidden nodes are displayed in area 150 of network 100. As before, for the hidden layer nodes, the expressions for progressively improving the weights for those nodes are:

$$\Delta w_{ji} = \eta \sum_{p=1}^{p=P} O_{pj}(1 - O_{pj})\left(\sum_{k}\delta_{pk}w_{kj}\right)O_{pi} \quad \text{(Equation 4A)}$$

OR $$\Delta w_{ji} = -\eta \frac{\partial E}{\partial w_{ji}} = \frac{1}{P}\sum_{p=1}^{p=P}\eta \delta_{pj} O_{pi}, \quad \text{(Equation 4B)}$$

where $O_{pi}$ is the output signal for the the node of the layer preceeding the jth layer of the pth input data pattern.

It should be appreciated that a "hidden layer" can be a non-linear functional transformation layer, such as practiced in the functional link, and radial basis function architectures.

The data patterns may be regarded as vectors in pattern space and their components would vary in value depending on the coordinate system used to describe them, or equivalently the basis vectors used to span that space.

It is a fact that the trace of the data co-variance matrix is invariant with respect to linear transformations of the basis vectors spanning the pattern space. The present approach allows the transformation to be nonlinear but nevertheless seeks to conserve the total variance.

Some simplifications can be made in the learning procedure prescribed by equations (3) and (4A, 4B). Since interest is in the relative positions of the various patterns, the mean values of each of the features in the original full-dimensional representation is of no significance. Those values can be set to zero in equation (3). This amounts to a bodily shift of the entire distribution of pattern vectors as one rigid body and no relative position information is lost.

Similarly in equation (3), it is suitably decided ahead of time that the reduced-dimension distribution of pattern vectors will be one of zero mean. This removes a somewhat bothersome step of calculating an ever changing mean as learning proceeds. Setting the mean as a condition in the learning amounts to exerting a bodily shift of the relative distribution.

Although equation (3) is retained as such, the variance constraint really amounts to a signal strength constraint. Learning consists of learning a single set of weights which will map all pattern vectors in the same way, striving to make each feature value, in the reduced-dimension space, as close to zero as possible and yet conserve the total signal strength, or equivalently, the (zero mean) variance.

Further theoretical investigations are underway but the present practice must be considered to be motivated and justified more by results rather than by theory. Some representative results are presented in this and subsequent sections of this discussion.

The results for three different approaches to reduced-dimension self-organization are presented in this section for reduction of 3-D data to 2-D. Of course this is a strange action to pursue if the data are intrinsically 3-D. On the other hand, the intrinsic dimension is generally unknown in most cases and so this simple and well controlled exercise might provide some insight as to what happens when the dimensionality of the new representation is less than that of the intrinsic dimensionality.

If points along a three dimensional helix are to be represented in a "self-organized" 2-D presentation, what would that presentation look like? In other words what informations are discarded and what are preserved?

Figure 2:
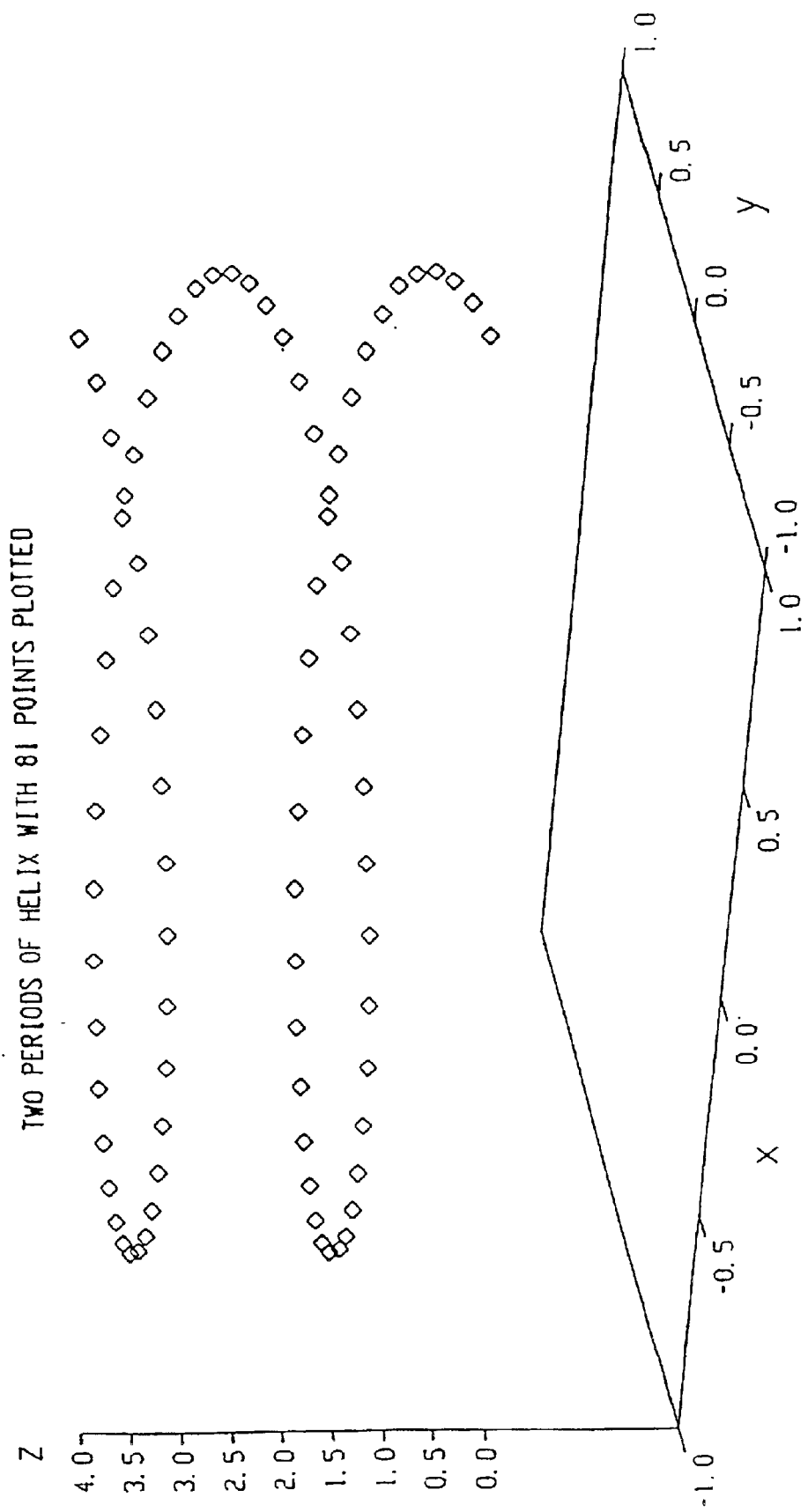
FIG. 2 illustrates a three-dimensional graph of two periods of a helix with 81 points plotted.
Figure 3:
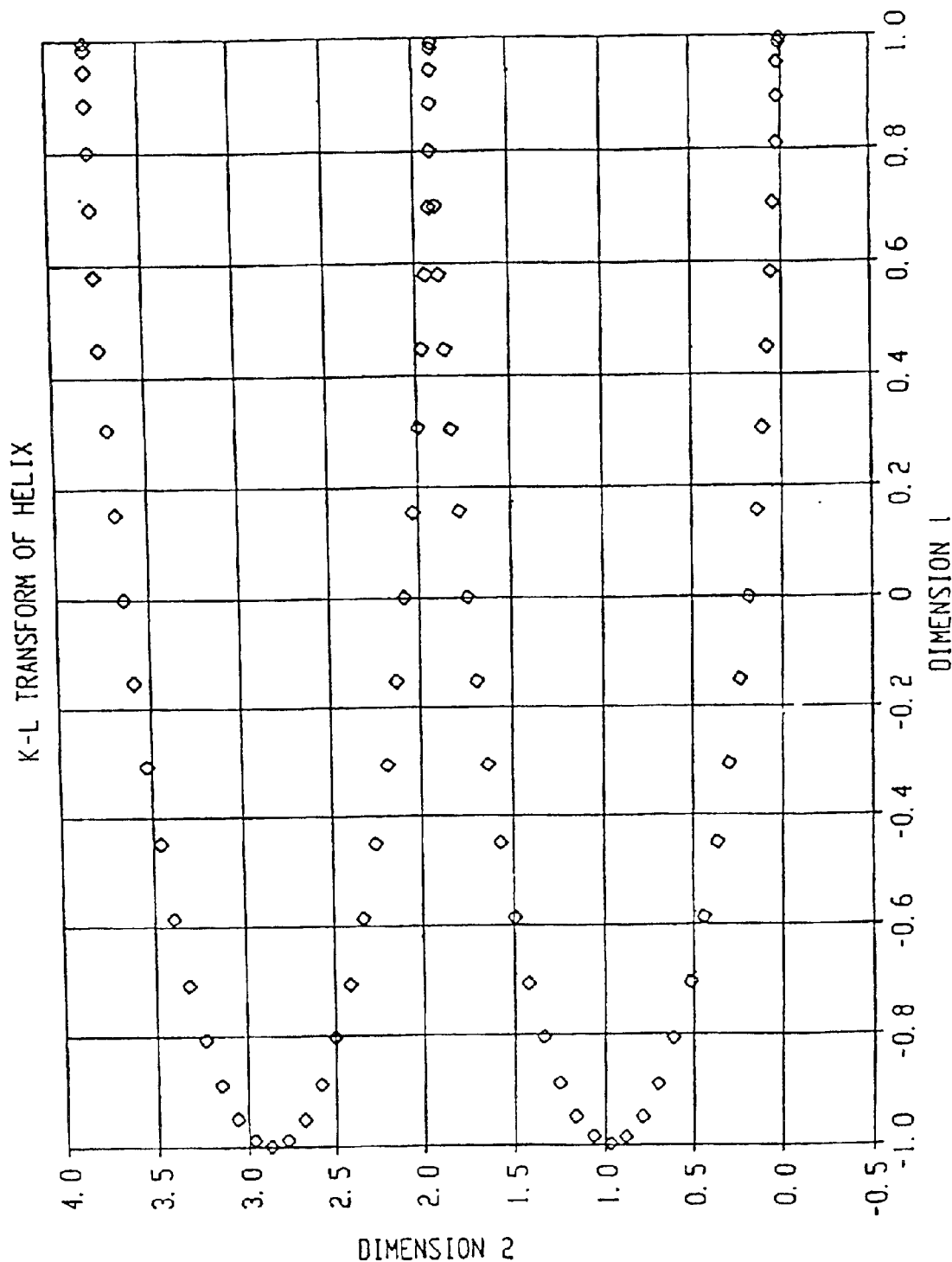
FIG. 3 illustrates a two-dimensional representation of a Karhunen-Loeve (K-L) transformation of a helix.
Figure 4:
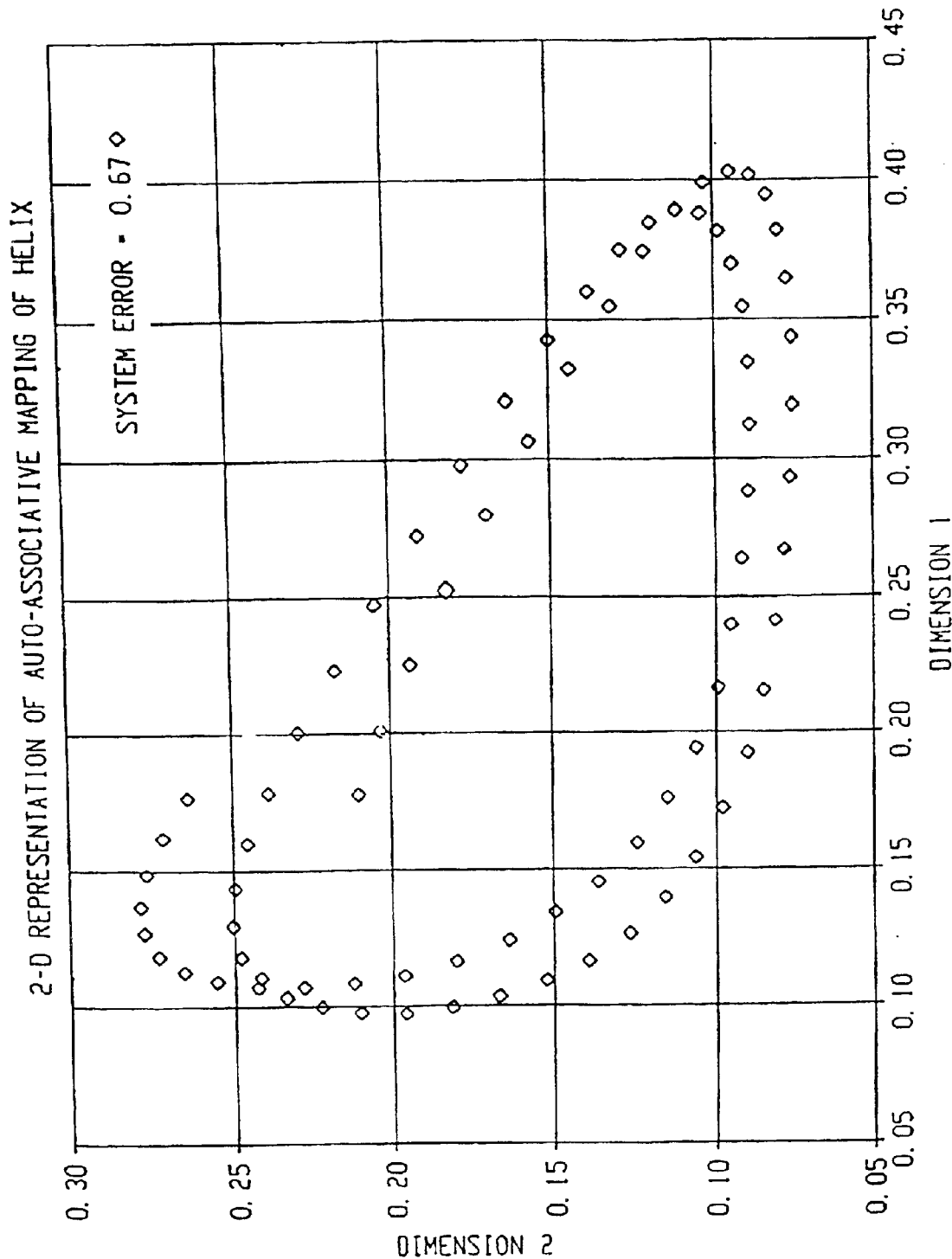
FIG. 4 illustrates a two-dimensional representation of a helix with auto-associative mapping.
Figure 5:
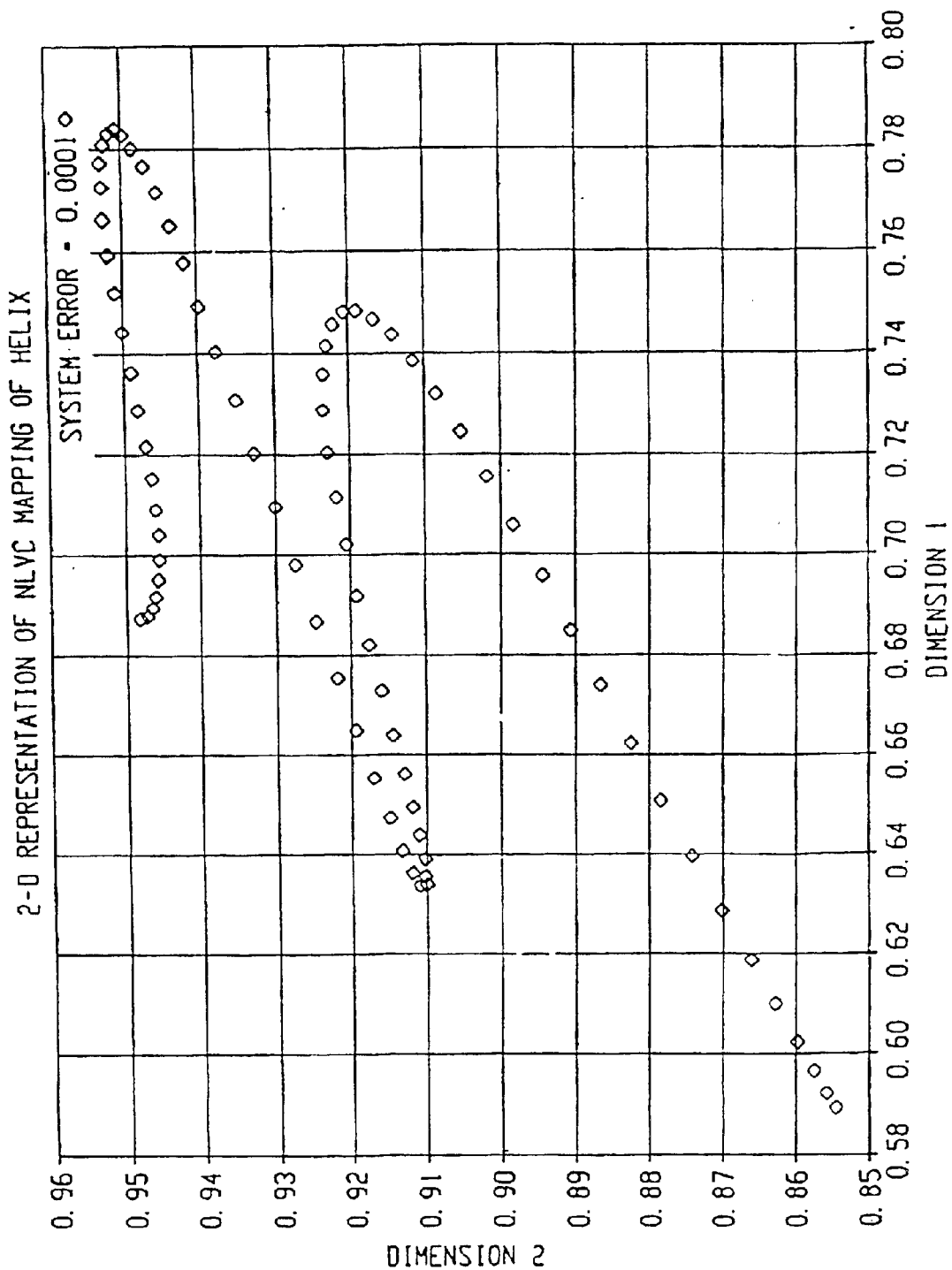
FIG. 5 illustrates a two-dimensional representation of a helix with non-linear variance-conserving mapping.

Data points along a helix are illustrated in FIG. 2. The 2-D self-organized K-L depiction of that data is shown in FIG. 3, that obtained with auto-associative mapping is shown in FIG. 4, and the 2-D representation obtained with this present approach is shown in FIG. 5.

For this particular case at least, the reduced-dimension representation obtained with this present non-linear variance conservation (NLVC) method is less ambiguous than that obtained with the auto-associative method.

The present work provides dimension-reduction while conserving as much as possible information regarding the inter-pattern differences. The advantages and disadvantages of the K-L, auto-associative, and nonlinear variance-conserving methods are as follows.

The K-L Transform Method

Advantages—Well understood theoretical basis.

Disadvantages—Lengthy computation of co-variance matrix; linear constraint leads to loss of information when dimension-reduction is large.

The Auto-Associative Method

Advantages—theoretical basis conceptually sound; nonlinear if desired.

Disadvantages—long training times, easily overtrained to yield misleading mappings.

The Nonlinear Variance-Constraint Method

Advantages—conceptually sound, computationally highly efficient, significant dimension-reduction without distortions Disadvantages—additional theoretical investigations would be helpful in generalizing the approach and in revealing in what sense the mapping is "topologically" correct; computational results all suggest that order is conserved in some non-trivial manner, but it is difficult to be more precise than that at this point.

In literature, there is a body of gasoline-blending data which various investigators have used to assess the efficiency of their clustering or classification procedures. An example of such data is exhibited in Table 1 (FIG. 11), where each gasoline blend is described in terms of the amounts of their five constituents and also by its Research Octane Number. That body of five-dimensional data was mapped onto a two-dimensional space using the present NLVC approach. The resulting body of data is now easily displayed and viewed in two dimensions as shown in FIG. 6, with non-trivial gain in the understanding of what the data signify.

Figure 6:
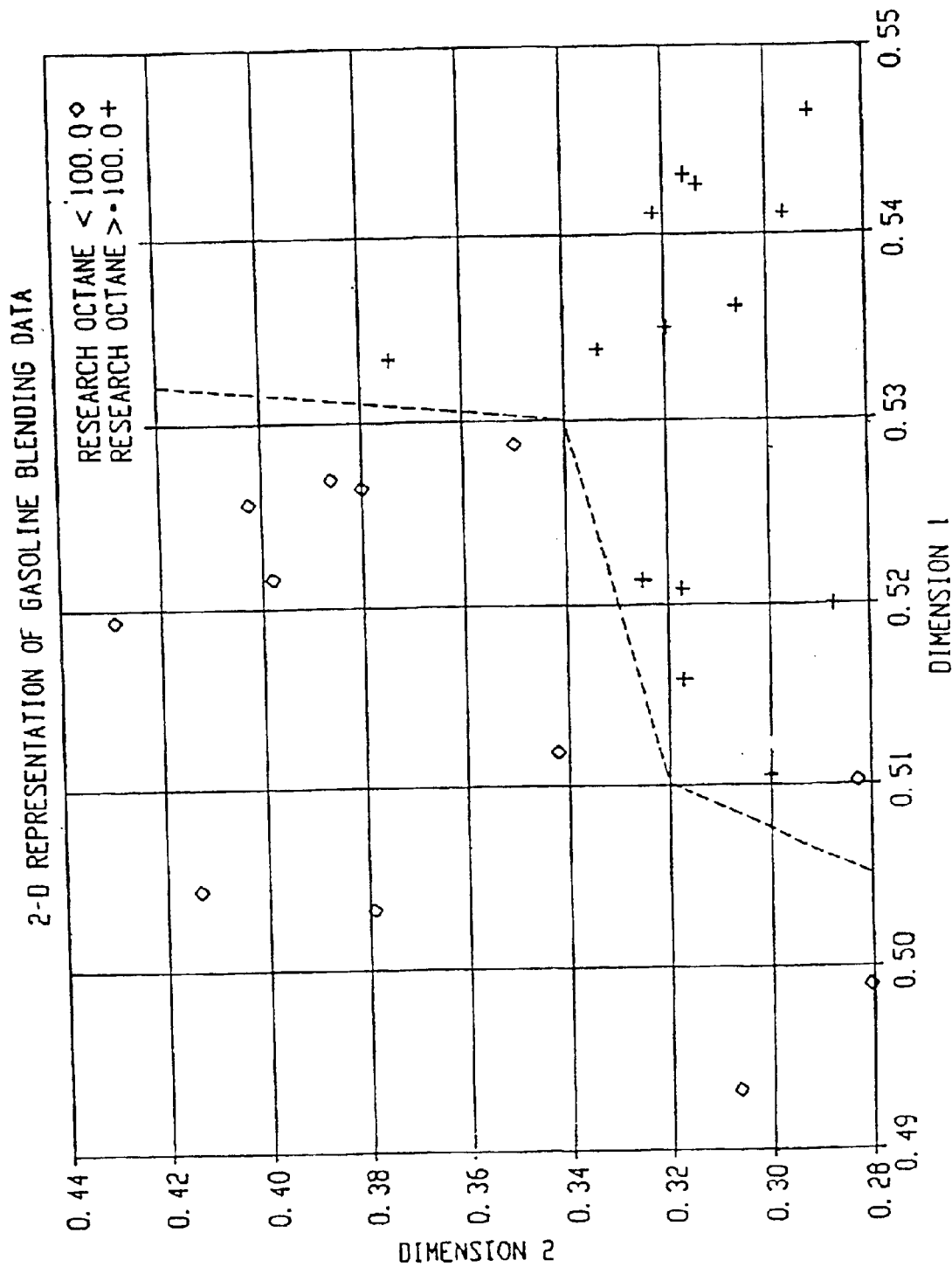
FIG. 6 illustrates a two-dimensional representation of gasoline blending data with non-linear variance-conserving mapping.

Such a plot will suitably serve as a memory as well as classification rule formulation device, as indicated by the drawing of the lines in FIG. 6, lines which seem to separate the high-octane blends from the low octane ones. In addition, in such a plot, it is readily discerned that three of the blends do not conform with the suggested "rule." It is interesting that similar violations of rules were observed in mappings obtained with the K-L and auto-associative methods.

Figure 7:
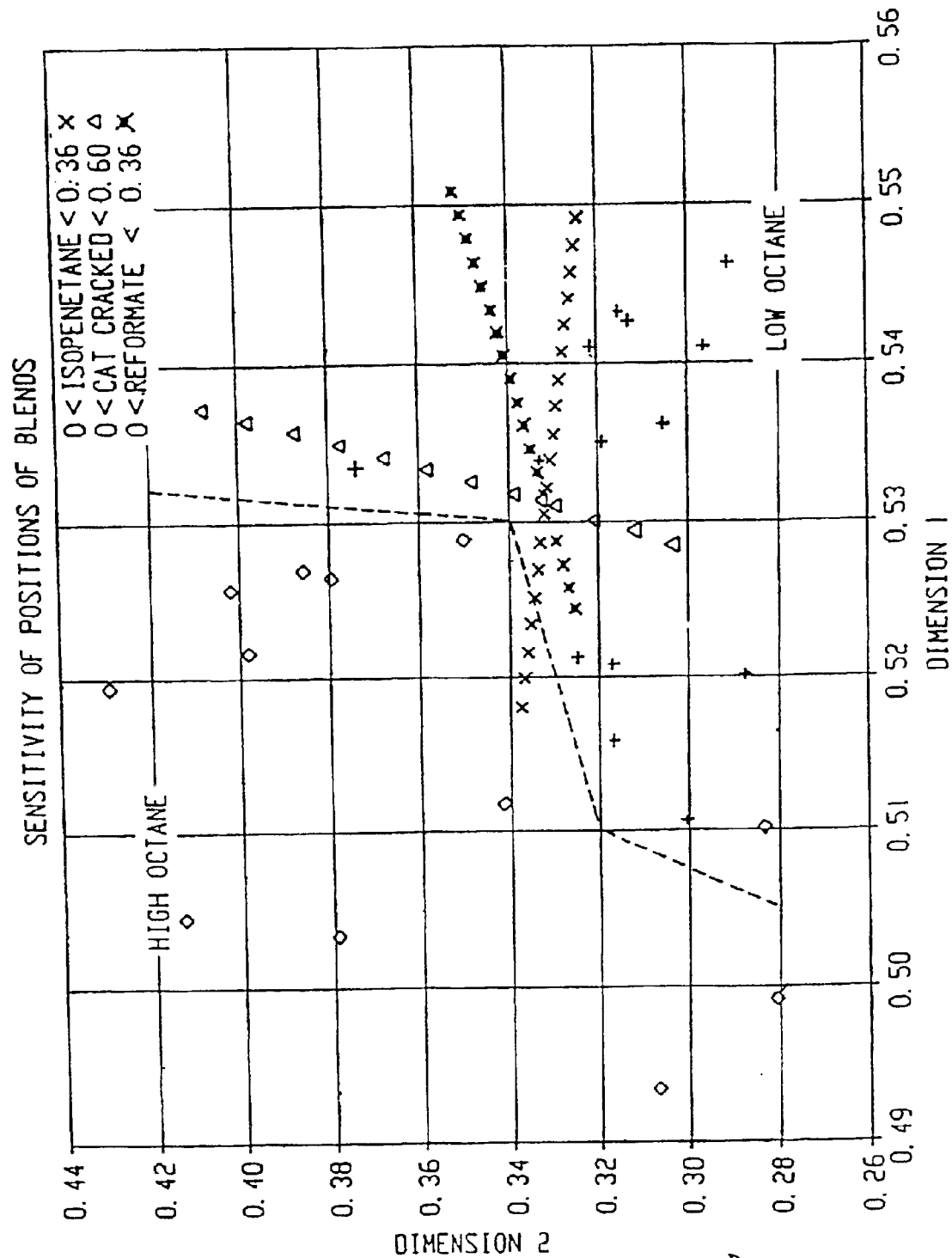
FIG. 7 illustrates a sensitivity of positions of blends with respect to the content level of isopenetane, cat cracked, and reformate.

The sensitivity of the location of a point in the two-dimensional space to changes in the original five-dimensional space can be explored readily and some indications of that are depicted in FIG. 7. Such information provides guidance on how other improved blends might be formulated in various different composition regions.

The present NLVC dimension-reduction system is also suitably used to map complex time-dependent sensor output profiles into points in two dimensional space. In addition, changes in the nature of the profile can be detected as motion of that point in the reduced-dimension space.

In a certain industrial installation, the condition of the process was monitored by sensors and the time-dependent sensor output profiles can be used to provide information as to whether the operation would be in or near "fault" condition. In this study, the profiles from one sensor were reduced to patterns of five features each, as shown listed in Table 2 (FIG. 12). Two bodies of such data were prepared, one for "training" the interpretation mode and the other for testing the usefulness of the interpretation scheme.

Figure 8:
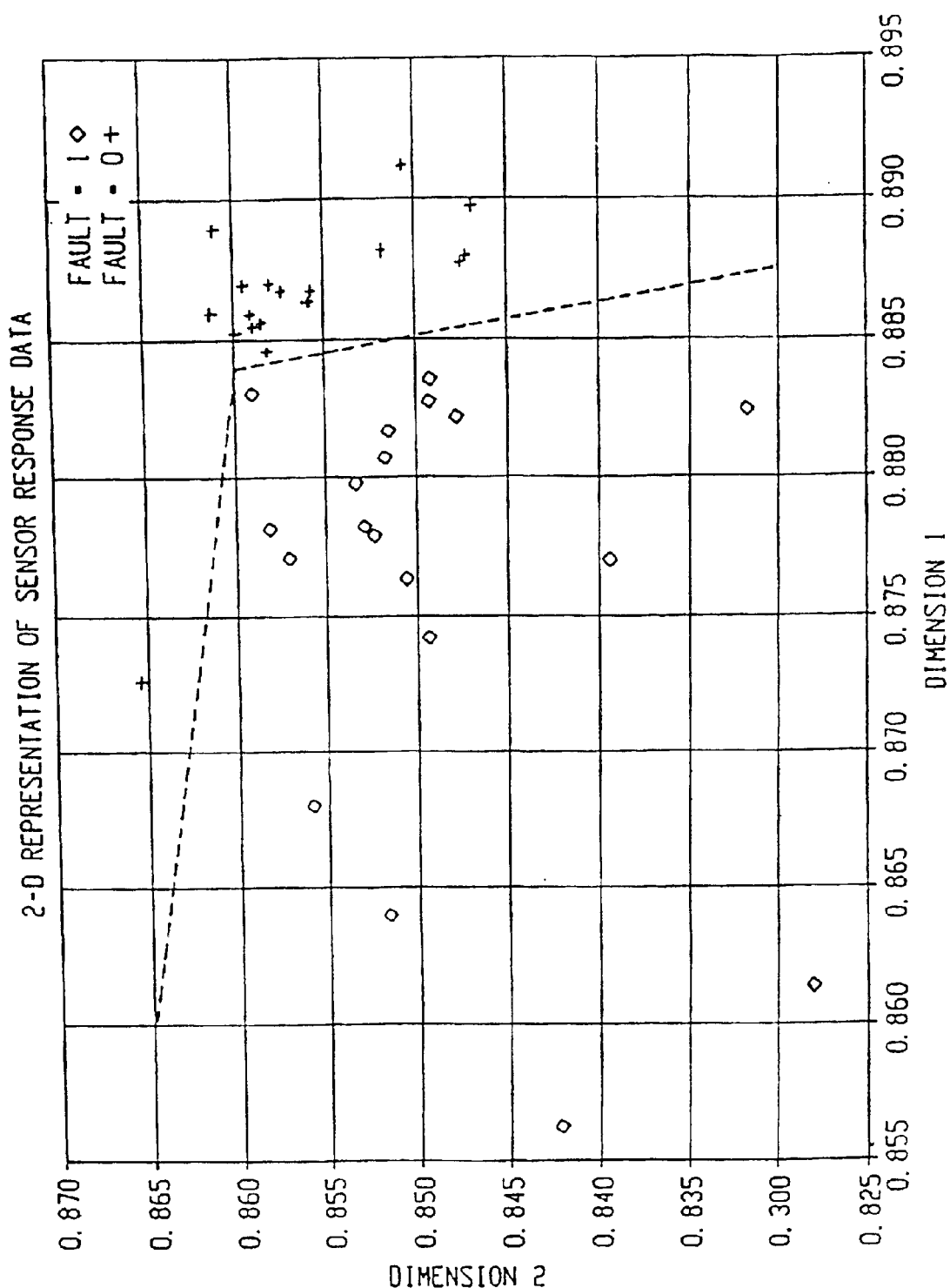
FIG. 8 illustrates a two-dimensional representation of sensor data with non-linear variance-conserving mapping.

Using NLVC mapping, each of the profile patterns was reduced to a 2-D point and the entire set of training set profiles can be displayed in a single 2-D plot as shown in FIG. 8.

The so-called "training" action amounts to indicating what is known of each point in the two dimensional space, whether that point, representing a sensor output profile, was associated with a "fault" or "no fault" condition.

Figure 9:
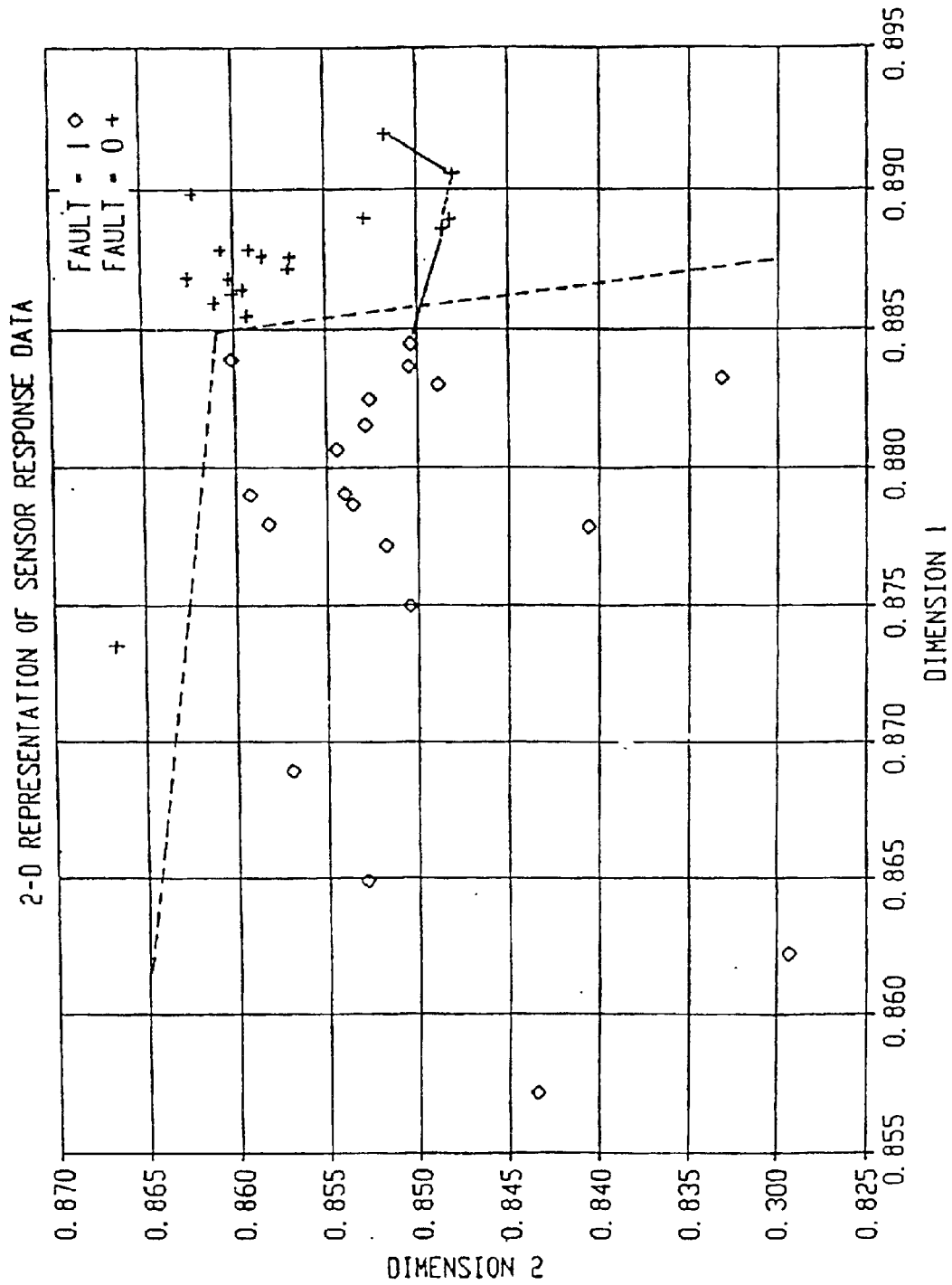
FIG. 9 illustrates a trace of successive sensor profiles monitoring from "non-fault" to "fault;"
Figure 10:
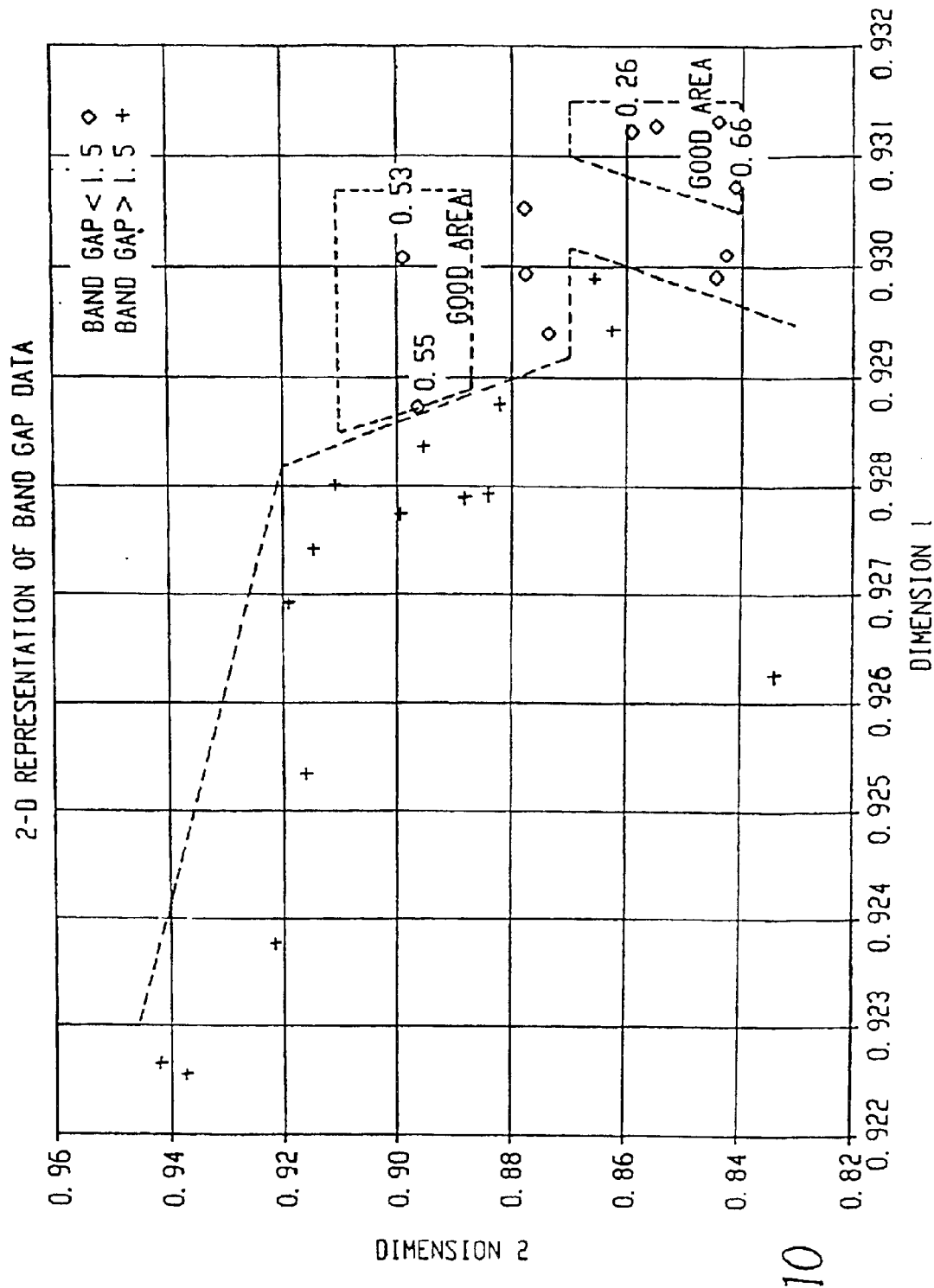
FIG. 10 provides a two-dimensional representation of band gap data with non-linear variance conservation mapping.

It turns out for the data processed, the profiles are indeed representative of "fault" or "no fault" conditions. In the plot of FIG. 8, the points representing the two types of profiles do indeed separate cleanly, albeit not linearly. Given such circumstances, a rule for classifying a new profile as "fault" or "no fault" can be easily formulated. As shown in FIG. 9, such a rule was well validated with points from the test set of profiles.

Values of four representative crystal-structure parameters are listed in Table 3 (FIG. 13) for a number of semiconductor materials. Listed also are values of the "bandgap" in the electronic band structure of such materials.

NLVC mapping of the four-feature crystal-structure patterns yielded the map shown in FIG. 9. The low band-gap materials seem to lie towards the upper left portion of the map and study of that distribution might give some hint as to what combinations of crystal structure might be associated with low band-gap.

The subject system is disclosed with particular emphasis on two-dimensional displays as they are especially easy to comprehend. Three dimensional displays are suitably accommodated by humans as well. But all higher dimensional displays are opaque to visualization and to "understanding."

This new method is extremely efficient computationally. Experimental results indicate that it is "topologically correct" in some powerful and attractive manner.

The subject system seeks to conserve all the original variance while carrying out a nonlinear mapping to a reduced-dimension space. Maps obtained in the foregoing manner are suitably used for a variety of tasks, and can even be used as a visual associative memory, suitable for storing similar descriptions of objects and of time histories of the evolution of objects in associated manner, so that the mapping of a new object into a region of the memory would give hints as to what other matters one should be reminded of.

In variance-based approaches, the objective is to find a reduced-dimension mapping of the data, for which much of the variance of the data is retained, and for which the components of the data pattern vectors in the new representation are uncorrelated as much as possible.

It is seen that this approach yields results similar to that of the feature map method, in an interesting manner. It happens that patterns which have similar research octane ratings are mapped automatically into contiguous regions in the 2-D reduced dimension mapping. There is no thought of clusters. Instead a rather general category identification rule can easily be formulated. However the reduced-dimension map does provide guidance towards the formulation of improved blends.

Application of the method to complex sensor data indicate once again that patterns representing fault conditions are located in clearly self-organized regions of the 2-D maps, distinct from the patterns representing "no-fault."

In the cases mentioned, the category or property value must have been associated strongly with the pattern descriptions. The reduced-dimension mapping merely makes that circumstance more obvious and more easily visualized. In yet another case, this same approach was applied to a sparse body of data, sparse in the sense of not having many exemplars but also sparse in the sense that many feature values were missing so that in fact only a small subset of features where available for this exercise. The data were for a body of crystal structure parameters for semiconductors and there was interest in seeing whether certain regions of crystal structure "space" was associated with low band-gaps. The reduced 2-D map did give hints as to what regions might be fruitful for further exploration.

The second aspect of the present invention, Equalized Orthogonal Mapping (EOM), will now be described with reference to FIGS. 14–22. The intent of the EOM is to discover and display the inter-pattern relationship between the data patterns, with the mapping preserving the topology of the data as much as possible. This is achieved through constraining the values of the elements of the covariance matrix of the output during the learning process. At the end of the training, the covariance matrix of the output is reduced to the form of a constant times the identity matrix. This guarantees that the reduced dimensions are equally important and mutually orthogonal.

Figure 14:
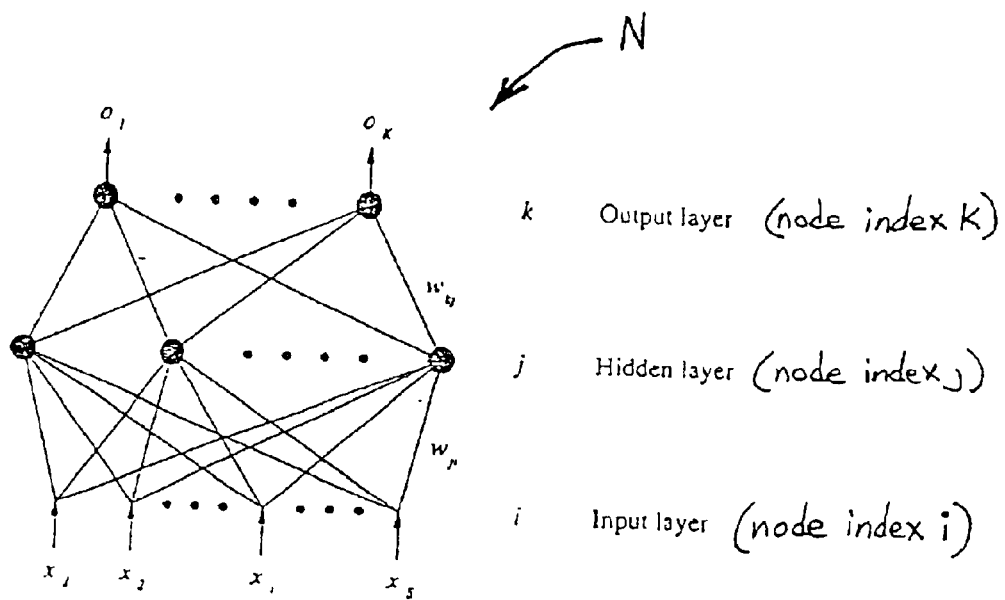
FIG. 14 illustrates a network structure for Equalized Orthogonal Mapping (EOM)

The EOM approach can be achieved with a conventional three-layer feedforward net N with one hidden layer, as shown in FIG. 14. Net N shows the network structure for equalized orthogonal mapping, which includes an input layer, hidden layer and output layer. The lines between the nodes are indicative of "links" between nodes of adjacent layers. As noted above, a "hidden layer" can be a non-linear functional transformation layer, such as practiced in the functional link and radial basis architectures.

Net N is trained using the backpropagation algorithm. In the beginning, the weights of the net are generated randomly in the interval [−W, W]. These weights are adjusted iteratively through the learning process.

Let $\{x_p\}$, p=1, 2, . . . , P, be a set of input data pattern vectors of S dimensions. The averaged variance of all dimensions of these data pattern vectors is given by:

$$V_{in} = \frac{1}{SP}\sum_{i=1}^{S}\sum_{p=1}^{P}(x_{ip} - \langle x_i \rangle)^2 \quad \text{(Equation 5)}$$

where "< >" denotes the average or mean taken over all of the input data pattern vectors for each indicated component (i.e., $<x_1>$ denotes the mean value of of $x_{ip}$ evaluated over the set of data pattern vectors), and $x_{ip}$ is the ith component of $x_p$, the pth member of a set of data pattern vectors.

To keep the generality of the discussion, assume there are K dimensions in the reduced-dimension representation. The covariance matrix of the outputs is thus a K×K matrix. Each element of the covariance matrix of the outputs (i.e., output signals) can be written as:

$$V_{out,k_1k_2} = \frac{1}{P}\sum_{p=1}^{P}(O_{k_1p} - \langle O_{k_1}\rangle)(O_{k_2p} - \langle O_{k_2}\rangle), \quad \text{(Equation 6)}$$

where:

p=1, 2, . . . , P;

$O_{k_1p}$ is the output signal of the $k_1$th node of the output layer for the pth input data pattern vector;

$O_{k_2p}$ is the output signal of the $k_2$th node of the output layer for the pth input data pattern vector;

$<O_{k_1}>$ is the average of $O_{k_1p}$ evaluated over the set of input data pattern vectors $<O_{k_2}>$ is the average of $O_{k_2p}$ evaluated over the set of input data pattern vectors $k_1$=1 to K;

$k_2$=1 to K;

K is the number of dimensions in the reduced-dimension representation; and

< > denotes the mean evaluated over the set of input data pattern vectors for each indicated component.

Due to the symmetry of the covariance matrix, only the terms in the upper triangle of the matrix need to be considered. The objective is to minimize the error E given by:

$$E = \sum_{k_1=1}^{K}\sum_{k_2=k_1}^{K} E_{k_1k_2} \quad \text{(Equation 7)}$$

where $E_{k_1k_2}$ is given by the following depending on whether the element is on the main diagonal or not.

$$E_{k_1k_2} = \left(\frac{V_{out,kk} - r_{kk}V_{in}}{r_{kk}V_{in}}\right)^2 \quad k_1 = k_2 = k, \quad \text{(Equation 8)}$$

$$k = 1, \ldots, K$$

$$E_{k_1k_2} = \left(\frac{V_{out,k_1k_2}}{r_{k_1k_2}V_{in}}\right)^2 \quad k_2 > k_1, k = 1, \ldots, K-1$$

$$k_2 = k_1 + 1, \ldots, K$$

It should be understood that $r_{kk}$ is a positive constant, which has an effect of increasing the speed of training, and $r_{k_1k_2}$ is a positive constant which has an effect of increasing the speed of training. Moreover, it should be appreciated that by minimizing the above error function, the covariance matrix of the output will end up in the desired form of a constant times a diagonal matrix, with a constant times the identity matrix being a practical option.

The constant, $V_{out,kk}$, is targeted to be proportional to the averaged input variance $V_{in}$. The constant r in Equation (8) is the relaxation factor which is usually less than unity. It is introduced to speed up the training further by reducing the output variance of each dimension. Since variance which is mostly comprised of information from quadratic terms also resembles the energy of a system, reducing the variance thus corresponding to relaxing the energy requirement for each dimension. This reduces the number of iterations for the net to achieve the desired error tolerance. Since variance also captures the inter-pattern relationship of the data, by making the variance of each output dimension proportional to the input variance, this method seeks to preserve as much relative position information as possible. The denominator is introduced for normalization purpose so that the error target specified will be independent of the value of the input variance.

The expressions for updating the weights iteratively can be obtained upon taking derivatives of the error E with respect to them. For the weights between the kth and jth layer, using sigmoidal neurons for both the hidden (jth) layer and the output (kth) layer, this is given by:

$$\Delta w_{kj} = -\eta\frac{\partial E}{\partial w_{kj}} = -\eta\left(\frac{\partial E_{kk}}{\partial w_{kj}} + \sum_{k_2=k+1}^{K}\frac{\partial E_{kk_2}}{\partial w_{kj}} + \sum_{k_1=1}^{k-1}\frac{\partial E_{k_1k}}{\partial w_{kj}}\right) \quad \text{(Equation 9)}$$

$$= \Delta w_{kj,1} + \Delta w_{kj,2} + \Delta w_{kj,3}$$

where $\Delta w_{kj,1}$ is the contribution from the diagonal term, $\Delta w_{kj,2}$ is the contribution from the off-diagonal terms in kth row and $\Delta w_{kj,3}$ is the contribution from the off-diagonal terms in kth column. The expressions of these three terms are as follows:

$$\Delta w_{kj,1} = -\eta\frac{\partial E}{\partial w_{kj}} = \frac{1}{P}\sum_{p=1}^{P}\eta\delta_{kp,1}O_{jp} \quad \text{(Equation 10)}$$

$$\Delta w_{kj,2} = -\eta\sum_{k_2=k+1}^{K}\frac{\partial E_{kk_2}}{\partial w_{kj}} = \frac{1}{P}\sum_{p=1}^{P}\eta\delta_{kp,2}O_{jp} \quad \text{(Equation 11)}$$

$$\Delta w_{kj,3} = -\eta\sum_{k_1=1}^{k-1}\frac{\partial E_{k_1k}}{\partial w_{kj}} = \frac{1}{P}\sum_{p=1}^{P}\eta\delta_{kp,3}O_{jp} \quad \text{(Equation 12)}$$

where $\delta_{kp}$ is a value proportional to the contribution to the error E by the outputs of the kth node of the output layer, for the pth input data pattern vector, and $\delta_{kp,1}$, $\delta_{kp,2}$, and $\delta_{kp,3}$ are components of $\delta_{kp}$, $\delta_{kp,1}$, $\delta_{kp,2}$ and $\delta_{kp,3}$ (for sigmoidal functions) are given by:

$$\delta_{kp,1} = 4(V_{out,kk} - rV_{in})(\langle O_k \rangle - O_{kp})O_{kp}(1-O_{kp}) \quad \text{(Equation 13)}$$

$$\delta_{kp,2} = 2\left(\sum_{k_2=k+1}^{K} V_{out,kk_2}(\langle O_k \rangle - O_{kp})\right)O_{kp}(1-O_{kp}) \quad \text{(Equation 14)}$$

$$\delta_{kp,3} = 2\left(\sum_{k_1=1}^{k-1} V_{out,k_1 k}(\langle O_{kp} \rangle - O_{kp})\right)O_{kp}(1-O_{kp}), \quad \text{(Equation 15)}$$

where $O_{kp}$ is the output signal from the kth node in the output layer for the pth input data pattern vector, $\langle O_{kp} \rangle$ is the average of $O_{kp}$ evaluated over the set of input data pattern vectors, and $O_{jp}$ is the output signal form the ith node in the layer preceeding the output layer for the pth input data pattern vector.

To simplify the notation, combine Equations (13), (14) and (15) and denote:

$$\delta_{kp} = \delta_{kp,1} + \delta_{kp,2} + \delta_{kp,3} \quad \text{(Equation 16)}$$

Equation (7) can then be rewritten in the more familiar generalized delta rule form, $$\Delta w_{kj} = \frac{1}{P}\sum_{p=1}^{P} \eta \delta_{kp} O_{jp} \quad \text{(Equation 17)}$$

Further backpropagation of error to the weights between the jth and ith layer remains the same as in a conventional net, the expressions are:

$$\Delta w_{ji} = \eta \frac{\partial E}{\partial w_{ji}} = \frac{1}{P}\sum_{p=1}^{P} \eta \delta_{jp} x_{ip} \quad \text{(Equation 18)}$$

where, $\delta_{jp}$ is given by:

$$\delta_{jp} = \left(\sum_{k=1}^{K} \delta_{kp} w_{kj}\right) O_{jp}(1-O_{jp}) \quad \text{(Equation 19)}$$

The EOM approach is evolved from the NLVC mapping approach. In NLVC mapping, the objective of learning is to conserve the total variance in the description of data patterns, that is, the A eights of the net are learned such that the difference between the total variance of the outputs and the total variance of the inputs is within a certain prescribed limit, that is, the error function for NLVC is simply:

$$E = \frac{1}{4}(V_{out} - V_{in})^2 \quad \text{(Equation 20)}$$

where $V_{out}$ is given by:

$$V_{out} = \frac{1}{PK}\sum_{p=1}^{P}\sum_{k=1}^{K}(O_{kp} - \langle O_k \rangle)^2 \quad \text{(Equation 21)}$$

and $V_{in}$ is same as Equation (5). Using the exact the same net structure and backpropagation learning algorithm, the parameter $\delta_{kp}$ is given by:

$$\delta_{kp} = (V_{out} - V_{in})(\langle O_k \rangle - O_{kp})O_{kp}(1-O_{kp}) \quad \text{(Equation 22)}$$

The formulae for iteratively updating the network weights are of the same forms as Equations (17) to (19).

The NLVC approach is computationally highly efficient and the resulting reduced-dimension maps have been shown to be useful in applications such as classification, categorization, monitoring and optimization.

One reason for the high efficiency of the NLVC approach is that the variance conservation constraint is rather loose. Indeed, the constraint given in Equation (22) is even weaker than that in Equation (13) alone. But this also has side effects. Given a different set of randomly generated initial weights for the net through a different random number seed, the resulting map for the same input looks quite different and the distribution of the points on the map is often uneven with strong correlation between the reduced dimensions. Though it is still possible to gain some qualitative information even from maps with uneven distribution of points, it is usually necessary to make some trials to get a map with good distribution of points.

A good way to reduce the correlation between the reduced dimensions is to orthogonalize the outputs of the net during the learning of the mapping. To achieve this goal, a natural point to start is to constrain the values of the elements of the covariance matrix of the outputs of the net. If all off-diagonal entries vanish, the outputs are orthogonal to each other. With all the off-diagonal terms reduced to zero, it is also easy to make all the reduced dimensions equally dominant by setting all the elements on the main diagonal of the covariance matrix to equal values. This forces the covariance matrix to have equal eigenvalues and the variance of each reduced dimension to be the same. To preserve as much topological information as possible during the mapping, each element of the main diagonal can be assigned to a value related to the average of the input variances for all the input dimensions through a relaxation factor. This is exactly what the EOM approach does.

Compared with the NLVC approach, this current approach puts a much stronger constraint on the learning procedure. Yet the sacrifice of efficiency is rather small. For example, when the reduced dimension is 2-D, i.e. K=2 which is most useful for visual display, the covariance matrix of the outputs is a 2×2 matrix, and there is only one off-diagonal term which needs to be computed compared with two diagonal terms which have to be computed by both approaches. For each iteration of training, this only introduces a roughly 50% overhead in the computing of $\Delta w_{ki}$ using EOM compared to using NLVC. The computation for $\Delta w_{ji}$ is the same for both approaches.

Examples of use of EOM with comparisons to that of SOM and NLVC will now be described with reference to FIGS. 15–22. For EOM and NLVC, sigmoidal neurons were used in both hidden and output layers. In order to visualize the resulting maps, the number of output neurons were chosen to be 2. Since for real multidimensional data, the inherent dimensions may not correspond to any simple physical quantity, and only the relative positions of the data points are of interest, the absolute scales of the two reduced dimensions are of no importance. Thus, the outputs were linearly mapped into an image of 512×512 pixels and no labeling is done for the two axes.

The following simple 5-D function with 2 inherent dimensions is used as a first test since the theoretical solution is known.

$$z = \sin\left(\frac{\pi}{2}(x_1 + x_2 + x_3)\right)\cos(2\pi(x_4 + x_5))  \quad\text{(Equation 23)}$$

In Equation (23), the five variables are not all independent but are related in the following manner:

$$x_1=t_1,\ x_2=2t_1-1,\ x_3=1-t_1,\ x_4=t_2,\ x_5=1-2t_2$$

where $t_1$ and $t_2$ represents the 2 inherent dimensions of the function and are inside the interval [0, 1]. One hundred data patterns were generated randomly in the given range and served as the raw data set.

Figure 15:
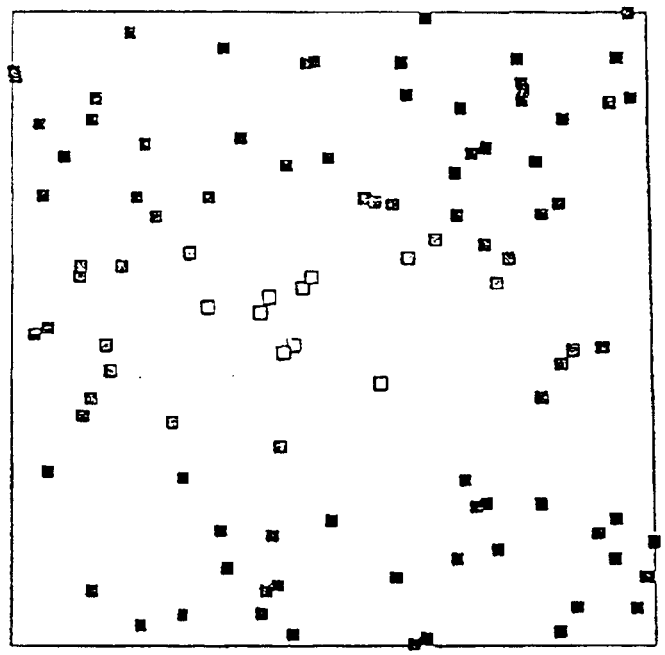
FIG. 15 illustrates a theoretical 2-dimensional map for an equation providing a solution for a 5-dimensional function with 2 inherent dimensions.
Figure 16A:
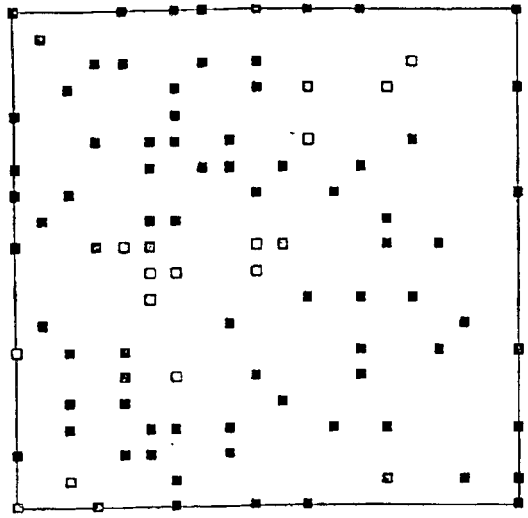
FIGS. 16A–16D illustrate reduced dimension maps for a 5-D function with 2 inherent dimensions, obtained by Self-Organizing Mapping (SOM)
Figure 16B:
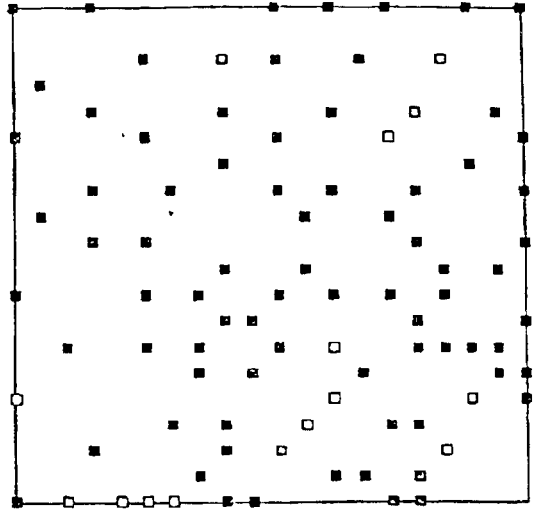
Figure 16C:
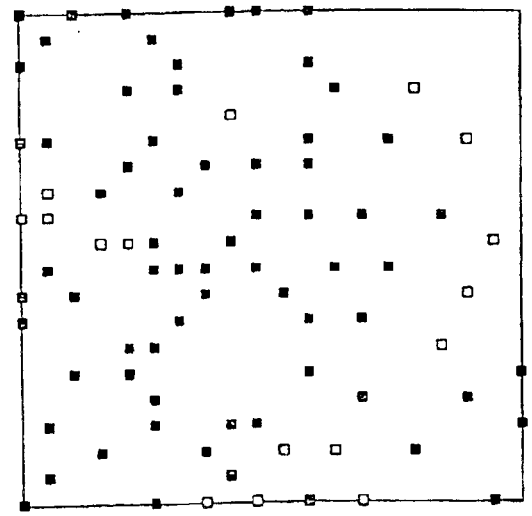
Figure 16D:
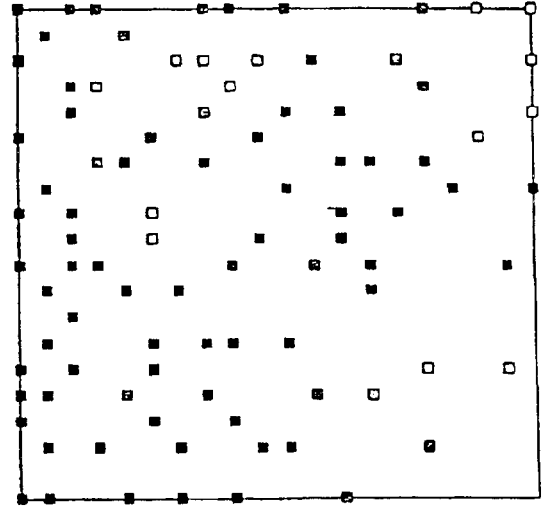

Using $t_1$, and $t_2$ as the two axes, an analytically generated 2-D map is shown in FIG. 15. The gray level shown inside each label square reflects the z value of the corresponding pair of ($t_1$, $t_2$). The range of the z values of these data points is linearly mapped to 256 gray levels with white representing minimum and black maximum.

FIGS. 16–18 show the mapping results of SOM, the NLVC approach and the EOM approach. The four maps are obtained with the same four random number seeds. For SOM, a 20×20 grid was used and the Gaussian function was used as the neighborhood (lateral excitation) function. During the learning of the mapping, the learning-rate factor α(t) linearly decreases from 0.9 to 0 and the width of the neighborhood kernel σ(t) linearly decreases from one half of the length of the side of the map to one unit length between grid points.

For NLVC and EOM, the number of hidden neurons was 15. The initial network weight parameters are identical for these two methods. For EOM maps, the relaxation factor r was chosen to be 0.1.

FIGS. 16A, 16B, 16C and 16D show reduced dimension maps for the function shown in Equation (23) obtained by SOM, where seed=7; seed=8; seed=4; and seed=3, respectively. It should be understood that the "seed" is a parameter used for generating initial reference vectors.

FIGS. 17A, 17B, 17C and 17D show reduced dimension maps for function shown in Equation (23) obtained by NLVC approach, where seed=7; seed=8; seed=4; and seed=3, respectively. It should be understood that the "seed" is a parameter used for generating initial network weights.

FIGS. 18A, 18B, 18C and 18D show reduced dimension maps for function shown in Equation (23) obtained by EOM approach, where seed=7; seed=8; seed=4; and seed=3, respectively. It should be understood that the "seed" is a parameter used for generating initial network weights.

It should be appreciated that the dark points and light points tend to separate in the maps obtained by SOM, but they hardly look like the theoretical map and neither do they look alike to each other. Since the data points are restricted to the grid points on the map, information on the fine relative positions of the data points as shown on the analytically generated map is lost. Different random number seeds also cause the resulting maps to look different. However, SOM maps usually give good coverage of the map area although that is restricted to grid points.

Figure 17A:
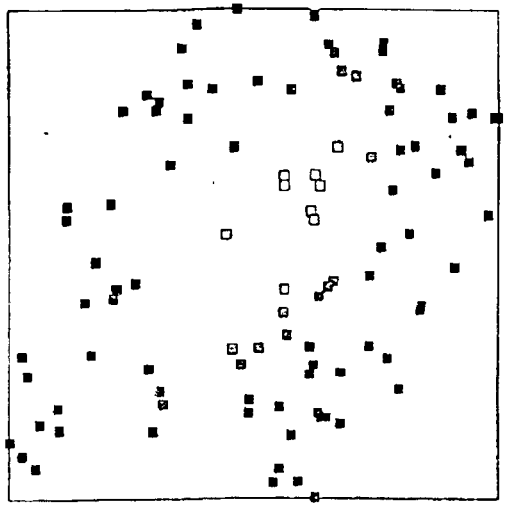
FIGS. 17A–17D illustrate reduced dimension maps for the same 5-D function, obtained by Non-Linear Variance Conserving (NLVC) mapping.
Figure 17B:
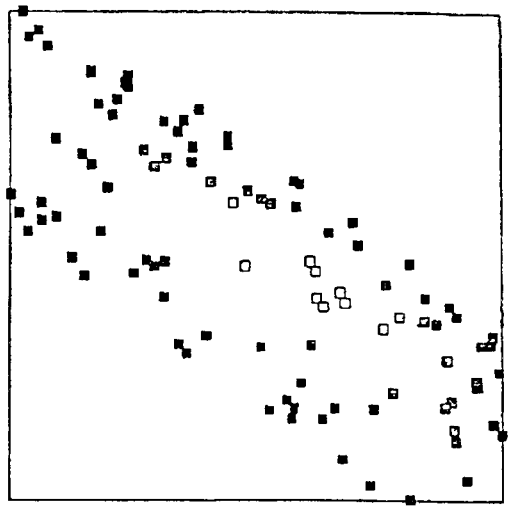
Figure 17C:
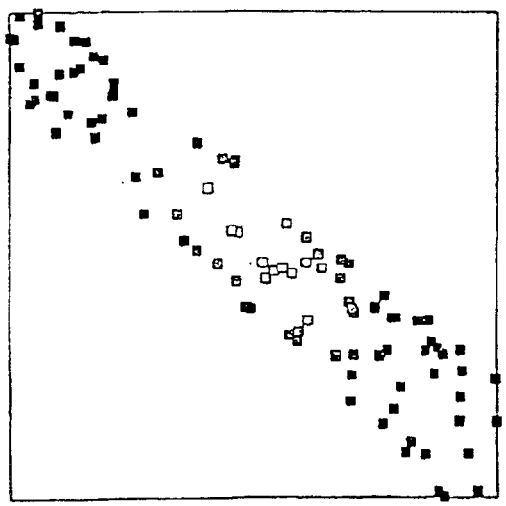
Figure 17D:
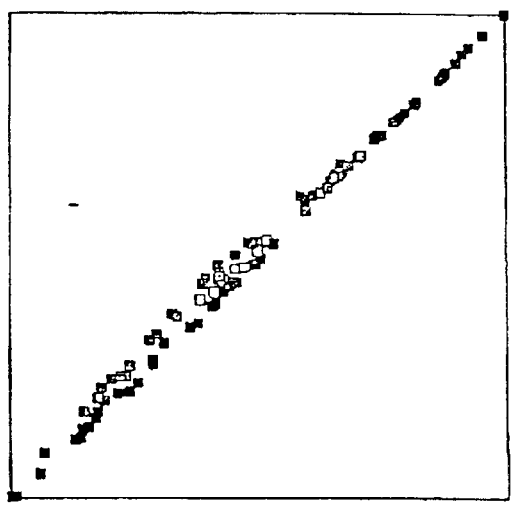
Figure 18A:
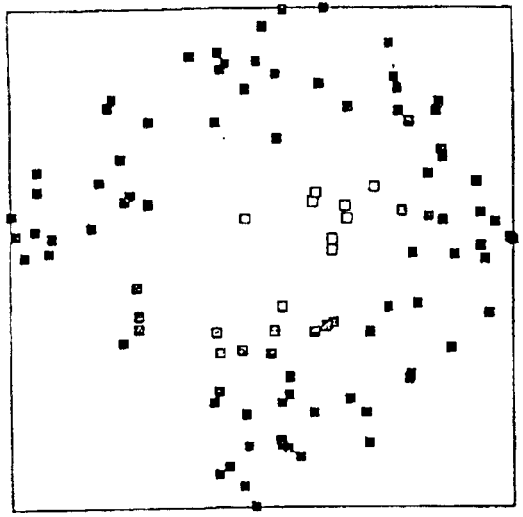
FIGS. 18A–18D illustrate reduced dimension maps for the same 5-D function, obtained by Equalized Orthogonal Mapping (EOM)
Figure 18B:
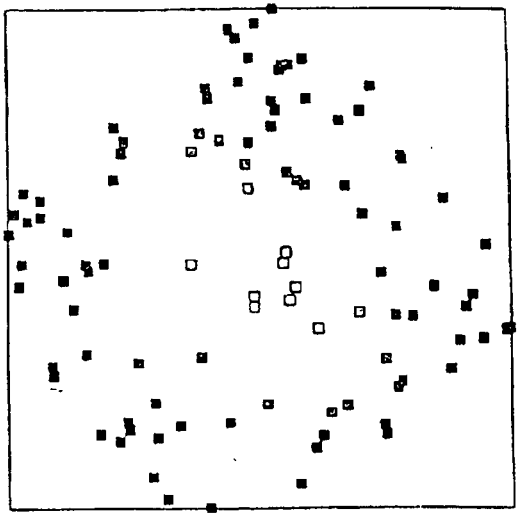
Figure 18C:
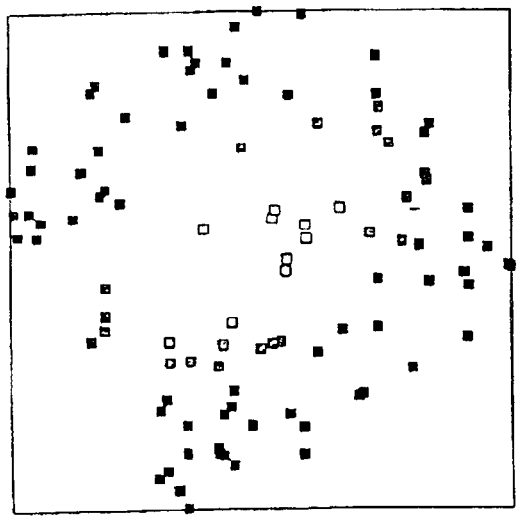
Figure 18D:
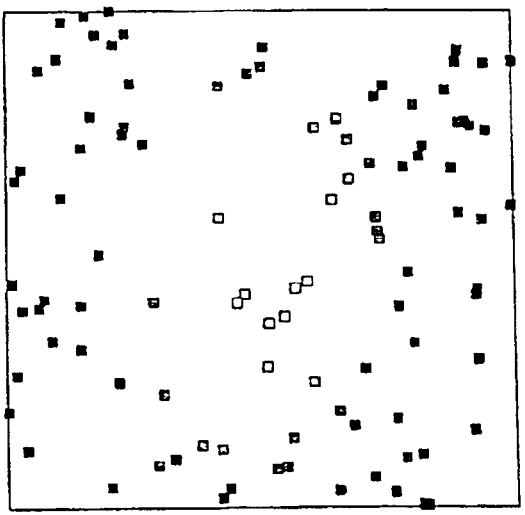

The apparent differences in the four maps obtained with the NLVC approach show that there is a strong dependency between the choice of the initial weights and the result of the mapping. However, upon close comparison between each of the four maps and the analytically generated one, it can be seen that despite the apparent differences of the four maps, they all can be transformed from the analytically generated map by some combinations of rotation, reflection and compression. That is to say, although the distribution of the data points as a whole is distorted to different degrees in these maps as compared to the analytically generated one, the relative positions of the data points seem to be preserved in them. In other words, the topology of the data points seems to be preserved in these maps in some local manner. However, the diagonal belt shape of distribution exhibited in the maps of FIGS. 17B, 17C, 17D, and to a lesser degree 17A, implies strong correlation between the two reduced dimensions. As a consequence, these maps fail to utilize the full capacity of the reduced dimensions. Though these maps are topologically correct in terms of the relative positions of the data points, the map of FIG. 17D is effectively useless and maps of FIGS. 17B and 17C may only be used for some qualitative descriptions of the data points. Only the map of FIG. 17A shows a relatively good distribution of data points which can be used in quantitative tasks such as optimization. These four maps serve as a good example to illustrate the need for a better mapping approach which not only keeps the map topologically correct but also reduces the randomness of the mapping and fully utilizes the reduced dimensions.

The four maps obtained with the EOM approach on the other hand show remarkable resemblance to each other and to the analytically generated one. Apart from rotation, reflection and the difference in scaling which was done automatically to fit the image, all four maps are essentially identical to the analytically generated one. This shows the robustness of the EOM approach in handling different initial conditions. One small detail to note is that the angle of rotation in these maps is either around 45° or 0°. Since theoretically the distribution of the data points forms a square region, and a square at those two angles makes the two dimensions equally dominant, this observation is reassurance that the EOM approach does achieve the goal to make full utilization of the reduced dimensions.

As for the computational efficiency, the case of 7 being used as the random number seed is used as an example for an empirical comparison. The EOM approach took less than 6 seconds to converge in 178 iterations. The NLVC approach took less than 2 seconds to converge in 12 iterations and the SOM approach took 117 seconds for 100 iterations. The efficiency improvement over SOM is significant. Although EOM takes longer than an individual NLVC run, it may still end up as a winner if a satisfactory map is not found in the first few trials of NLVC runs.

There is body of gasoline blending data in the literature, a subset of which contains those with all attributes known are given in the table of FIG. 11. This set of data have been shown to "self-organize" into two almost distinct regions for patterns with octane ratings higher than 100 and for those below 100 upon dimension reduction to 2-D using both autoassociative approach and the NLVC approach.

Figure 22A:
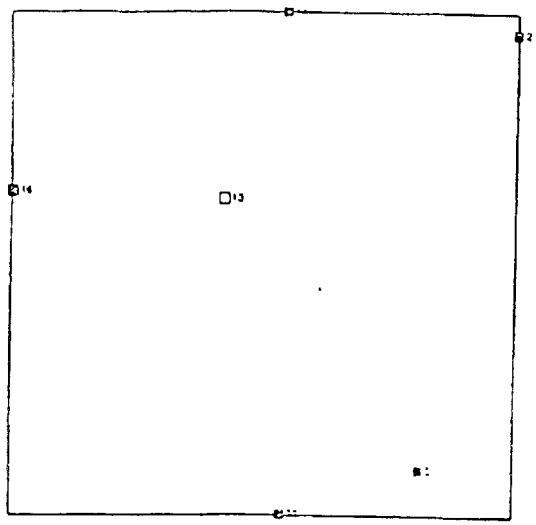
FIG. 22A illustrates a reduced dimension map of six patterns obtained by EOM.
Figure 22B:
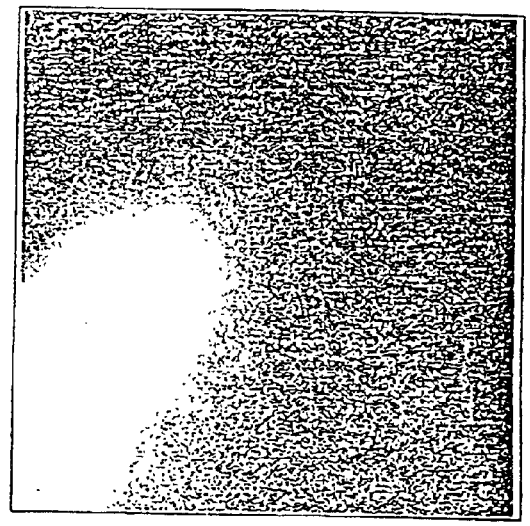
FIG. 22B illustrates model values of the region shown in FIG. 22A.

FIGS. 19A–19D show reduced dimension maps for the gasoline blending data shown in the Table of FIG. 11 obtained by SOM, with seed=7; seed=8; seed=4; and seed=3, respectively. FIGS. 20A–20D show reduced dimension maps for gasoline blending data shown in the table of FIG. 11 obtained by NLVC approach, with seed=7; seed=8; seed=4; and seed=3, respectively. FIGS. 21A–21D show reduced dimension maps for gasoline blending data shown in the table of FIG. 11 obtained by the EOM approach, with seed=7; seed=8; seed=4; and seed=3, respectively. FIGS. 22A and 22B shows a reduced dimension map based on the six gasoline blending data patterns of high octane ratings. FIG. 22A illustrates a map of the six patterns obtained by EOM approach, while FIG. 22B illustrates model values of this region.

For SOM, a 10×10 grid was used and the choice α(t) and σ(t) were same as above. For NLVC and EOM, the exact same net architectures were used to obtain the reduced dimension maps. Even the same random number seeds were used. FIGS. 19 to 21 show mapping results of SOM, the NLVC approach and the EOM approach. The gray level inside each label square reflects the octane rating of that pattern with lighter ones corresponding to higher octane ratings. Since there are only 26 patterns, pattern numbers are also shown.

Figure 19A:
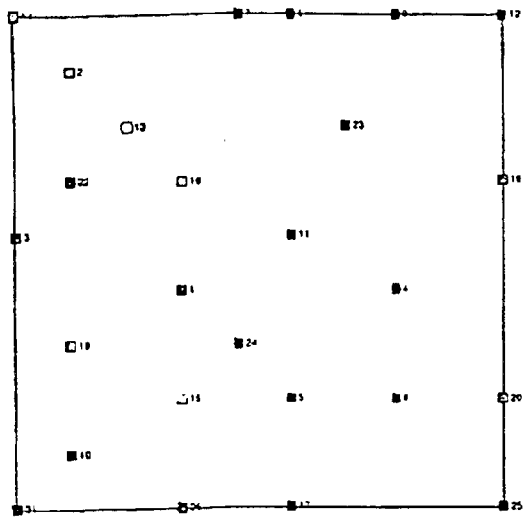
FIGS. 19A–19D illustrate reduced dimension maps for the gasoline blending data shown in FIG. 11, as obtained by SOM.
Figure 19B:
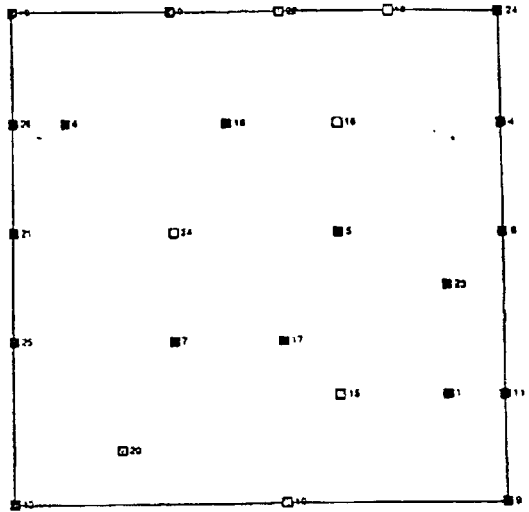
Figure 19C:
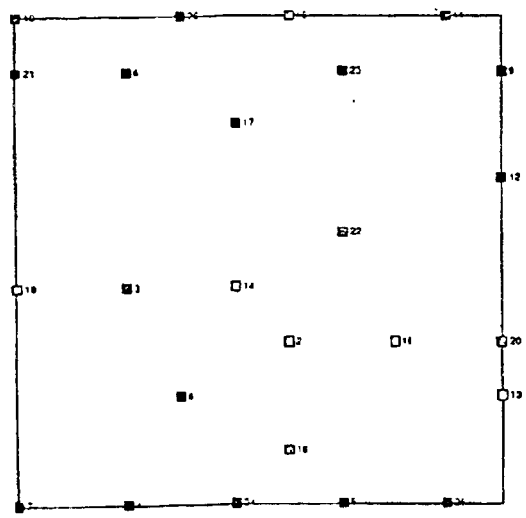
Figure 19D:
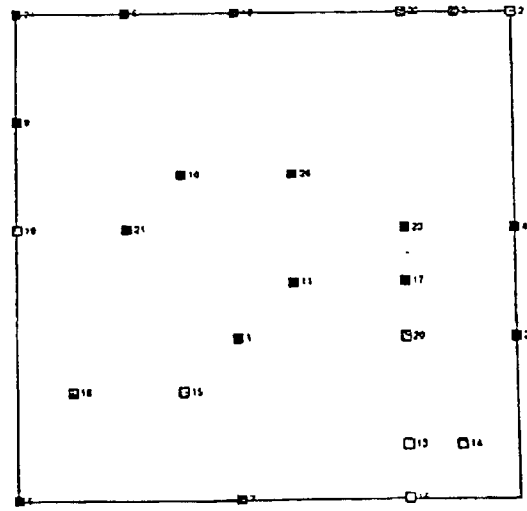
Figure 20A:
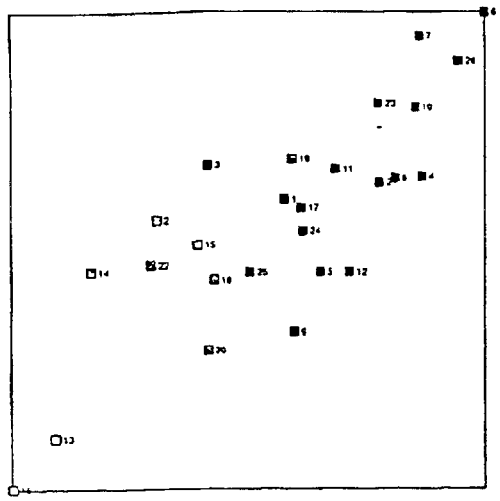
FIGS. 20A–20D illustrate reduced dimension maps for the gasoline blending data shown in FIG. 11, as obtained by NLVC.
Figure 20B:
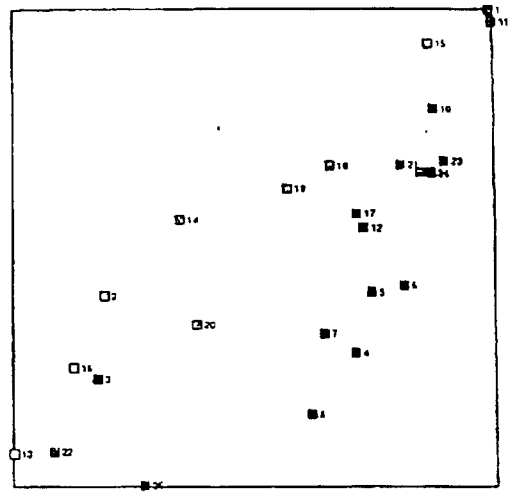
Figure 20C:
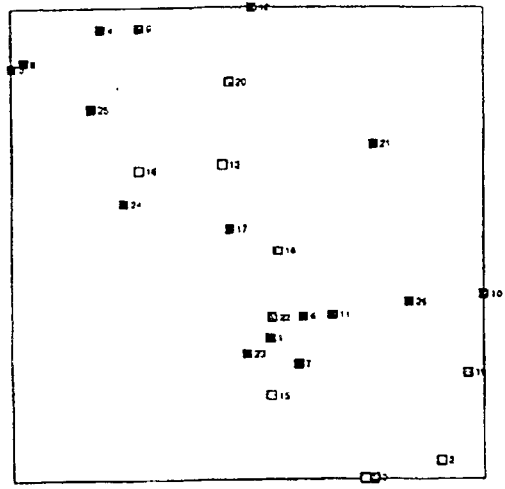
Figure 20D:
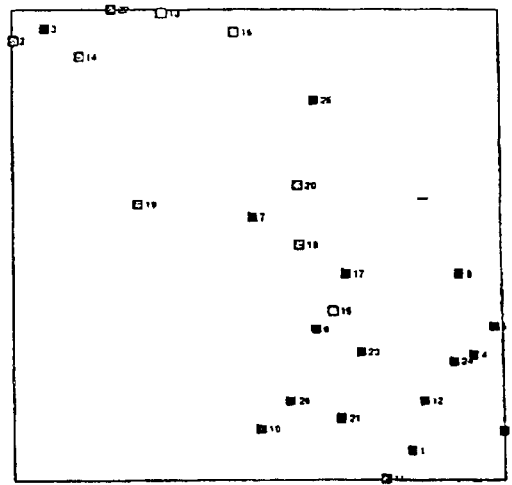
Figure 21A:
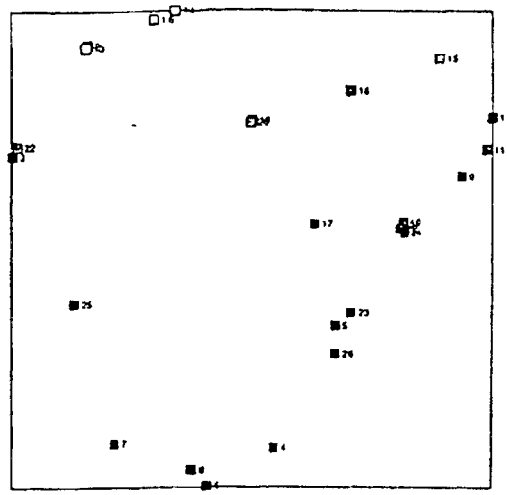
FIGS. 21A–21D illustrate reduced dimension maps for the gasoline blending data shown in FIG. 11, as obtained by EOM.
Figure 21B:
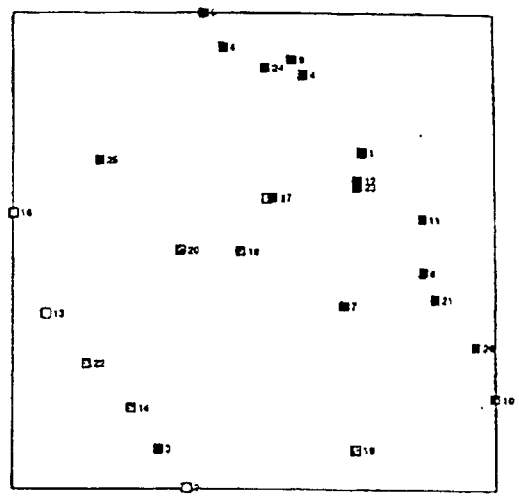
Figure 21C:
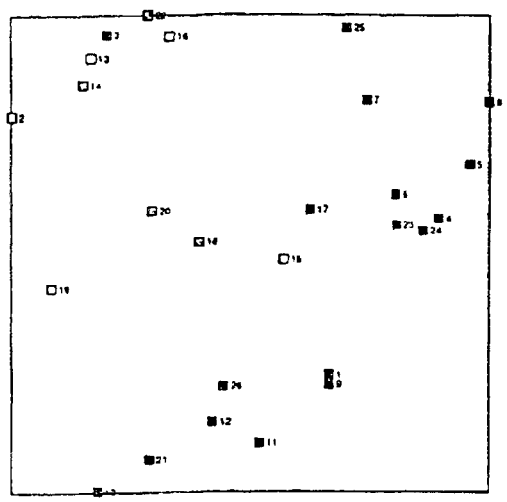
Figure 21D:
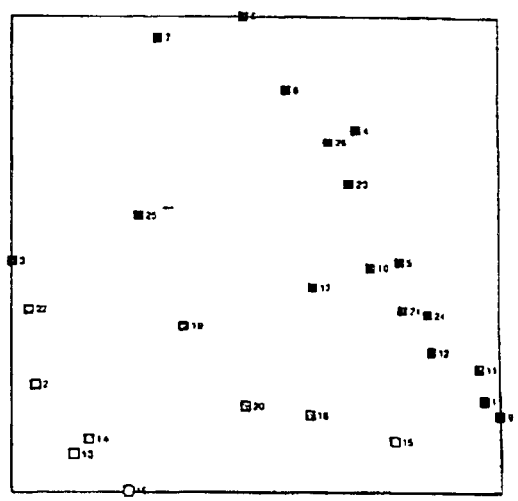

Once again, the SOM maps show separation of data points based on octane ratings to some degree with the map of FIG. 19A providing the best result. The dependency on initial parameters is again evident since the maps are quite different.

The NLVC maps again show the belt shape distributions of data points indicating the presence of correlation. But nevertheless all four maps show reasonable coverage of the map area to make them useful, at least for qualitative discussions. By examining the gray levels of the label squares, it can be seen that all four maps show some degree of separation between the light-shade points and the dark-shade ones with the map of FIG. 20B providing the best result. This agrees to previous NLVC results using different maps.

The EOM maps as expected show better coverage of the map area. The separation of high-octane data points and those of low-octane are even more evident on these maps. However, in maps obtained using both NLVC and EOM approaches, it is also evident that relative positions of data points in these four maps are not kept the same as in the case of the mathematical example, especially for those points which are close to each other as shown in the maps, with the EOM maps showing less variation than the NLVC maps. This however, does not mean that these maps failed to preserve the topology of the data set, but rather shows that the inherent dimension of the data set is actually higher than 2. Since it is not possible to show all the topology information in one 2-dimensional map for a data set of hither inherent dimension, different maps just represent projections from different "angles". This is analogous to the blue print of a part which needs projections from three sides to show the topology of that part. Though the projection process is a non-linear one for these dimension reduction maps.

Since the mathematical example demonstrated that the EOM approach essentially maintains map invariability for data with two inherent dimensions, any change except rotation and reflection in maps obtained from different initial weights is an indication that the inherent dimension of the data set is higher than then the dimension of the map. However, even with some changes evident, it does not necessarily render the resulting maps useless if these variations are not completely dominant. Much information can still be gathered since the different inherent dimensions of the data set may not be of equal importance. This is exactly the case for the gasoline blending data. Comparing the four maps obtained by the EOM approach, it can be seen that Patterns 2, 3, 13, 14, 16 and 22 which are of high octane ratings form a distinct group in all four maps. Furthermore, all the above patterns except Pattern 13 show up at least once on the edge of a map. This may indicate that Pattern 13, which gives the highest octane rating so far, is surrounded by the five high octane patterns, and that blends with even higher octane ratings might be found in this region. This is less evident on NLVC maps due to distortions from initial network parameters.

These six patterns were isolated from the rest of the set and an EOM map was generated for them. This is shown in FIG. 22A. Due to independent mappings of intensity to octane ranges, the exact shades of the six patterns are different from those in FIG. 21. The map indeed shows that Pattern 13 is surrounded by the other five patterns.

A model of 2-dimensional function was learned using the random vector version of the functional-link net. This model was used to predict the octane ratings in the region shown in FIG. 22A. The result is given in FIG. 22B. This figure shows that a point of even higher octane rating is located at:

$$d_1=85.51, d_2=173.5.$$

The corresponding expected octane rating is:

$$z=102.4.$$

The $(d_1, d_2)$ value can be mapped back into the original 5-D space with another random vector functional-link net. The results are:

$$x_1=0.226, x_2=0.096, x_3=0.058, x_4=0.022, x_5=0.599.$$

It should be noted that due to the limited number of patterns available in constructing the network models, the above results should be considered more in terms of providing guidance in future formulations than that of giving accurate prediction.

The present invention provides a new and unique approach to obtain topologically correct reduced dimension maps which can help visualize multidimensional data patterns. This approach is demonstrated to be able to reduce the randomness in the resulting maps due to the difference in the choice of initial network weights as is evident in other approaches of similar purposes. In addition, this approach can easily show whether the original data set can be described satisfactorily using the reduced dimension map by choosing different initial weights. The maps obtained by this approach fully utilize the map area and can be used to substitute maps obtained using other approaches of similar purposes in various applications.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A system for visualizing multi-dimensional pattern data reduced to a lower dimension representation, comprising:
   a neural network having an input layer and an other layer, wherein a number of nodes in the other layer is less than a number of input nodes in the input layer, and the other layer supplies an output signal corresponding to multi-dimensional pattern data received by the input layer; and
   a training module for the neural network, wherein the training module includes means for equalizing and orthogonalizing the output signal of the other layer.

2. The system of claim 1, wherein the training module equalizes and orthogonalizes the output signal of the other layer by constraining values of a covariance matrix of the output signal.

3. The system of claim 1, wherein the training module equalizes and orthogonalizes the output signal of the other layer by reducing a covariance matrix of the output signal to a form of a diagonal matrix.

4. The system of claim 1, wherein output data is collected from the neural network, and a two-dimensional map of the output data is displayed.

5. The system of claim 1, wherein output data is collected from the neural network, and a plurality of two-dimensional maps of the output data are displayed.

6. The system of claim 1, wherein the lower-dimension representation is a three dimensional display.

7. The system of claim 1, wherein the training module performs self-supervised training.

8. The system of claim 1, wherein the neural network is self organizing.

9. The system of claim 1, wherein nodes in the other layer are non-linear.

10. The system of claim 1, wherein the other layer comprises an output layer.

11. A method for visualizing multi-dimensional pattern data reduced to a lower dimension representation, comprising:
 providing a neural network having an input layer and an other layer, wherein a number of nodes in the other layer is less than a number of input nodes in the input layer, and the other layer supplies an output signal corresponding to multi-dimensional pattern data received by the input layer; and
 training the neural network to equalize and orthogonalize the output signal of the other layer.

12. The method of claim 11, wherein the output signal of the other layer is equalized and orthogonalized by constraining values of a covariance matrix of the output signal.

13. The method of claim 11, wherein the output signal of the other layer is equalized and orthogonalized by reducing a covariance matrix of the output signal to a form of a diagonal matrix.

14. The method of claim 11, further comprising collecting output data from the neural network, and displaying a two-dimensional map of the output data.

15. The method of claim 11, further comprising collecting output data from the neural network, and displaying a plurality of two-dimensional maps of the output data.

16. The method of claim 11, wherein the lower-dimension representation is a three dimensional display.

17. The method of claim 11, wherein the training is self supervised training.

18. A computer system, comprising:
 a processor; and
 a program storage device readable by the computer system, tangibly embodying a program of instructions executable by the processor to perform the method claimed in claim 11.

19. A program storage device readable by a machine, tangibly embodying a program of instructions executable by the machine to perform the method claimed in claim 11.

20. A computer data signal transmitted in one or more segments in a transmission medium which embodies instructions executable by a computer to perform the method claimed in claim 11.

* * * * *